United States Patent
Ström et al.

(10) Patent No.: US 7,636,471 B2
(45) Date of Patent: Dec. 22, 2009

(54) IMAGE PROCESSING

(75) Inventors: Jacob Ström, Stockholm (SE); Tomas Akenine-Möller, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 287 days.

(21) Appl. No.: 10/582,988

(22) PCT Filed: Jul. 8, 2004

(86) PCT No.: PCT/SE2004/001120

§ 371 (c)(1),
(2), (4) Date: Feb. 8, 2007

(87) PCT Pub. No.: WO2005/059836

PCT Pub. Date: Jun. 30, 2005

(65) Prior Publication Data

US 2007/0140554 A1    Jun. 21, 2007

(30) Foreign Application Priority Data

Dec. 19, 2003   (SE) ................................... 0303497

(51) Int. Cl.
*G06K 9/00*   (2006.01)
(52) U.S. Cl. ...................................... 382/166
(58) Field of Classification Search ............... 382/162, 382/164–167, 232, 243; 375/240.25
See application file for complete search history.

(56) References Cited

U.S. PATENT DOCUMENTS 5,444,800 A   8/1995   Kim
5,748,904 A   5/1998   Huang et al.
5,793,371 A   8/1998   Deering (Continued)

FOREIGN PATENT DOCUMENTS

CN   1307782 A   8/2001

(Continued)

OTHER PUBLICATIONS

Delph et al, "Image Compression Using Block Truncation Coding", IEEE Transactions on Communications, vol. COM-27, No. 9, Sep. 1979, pp. 1335-1342.

(Continued)

*Primary Examiner*—Jose L Couso
(74) *Attorney, Agent, or Firm*—Nixon & Vanderhye, P.C.

(57) ABSTRACT

In an image-encoding scheme, an input image is decomposed into several image blocks (600) comprising multiple image elements (610), e.g. pixels or texels. The image blocks (600) are then encoded into encoded block representations (700). Such a block representation (700) comprises a color codeword (710), an intensity codeword (720) and a sequence (730) of intensity representations. The color codeword (710) is a representation of the colors of the image elements (610) of the block (600). The intensity codeword (720) is a representation of a set of multiple intensity modifiers for modifying the intensity of the image elements (610) in the block (600). The representation sequence (730) includes an intensity representation for each image element (610) in the block (600), where a representation identifies one of intensity modifiers in the intensity modifier set. During decoding, the color and intensity codewords (710, 720) and intensity representations (730) are used to generate a decoded representation of the image elements (610) in the block (600).

48 Claims, 12 Drawing Sheets

U.S. PATENT DOCUMENTS

| | | | |
|---|---|---|---|
| 5,835,244 | A | 11/1998 | Bestmann |
| 5,926,647 | A | 7/1999 | Adams et al. |
| 5,956,431 | A | 9/1999 | Iourcha et al. |
| 6,297,826 | B1 | 10/2001 | Semba et al. |
| 6,404,923 | B1 | 6/2002 | Chaddha |
| 6,636,222 | B1 | 10/2003 | Valmiki et al. |
| 6,658,146 | B1 | 12/2003 | Iourcha et al. |
| 7,251,360 | B2 | 7/2007 | Takahashi |
| 2007/0019869 | A1 | 1/2007 | Ström |
| 2007/0071333 | A1 | 3/2007 | Ström et al. |
| 2007/0127812 | A1 | 6/2007 | Ström |

FOREIGN PATENT DOCUMENTS

| | | |
|---|---|---|
| EP | 0 739 139 | 10/1996 |
| WO | 2005/059836 A1 | 6/2005 |

OTHER PUBLICATIONS

Campbell et al, "Two BIT/Pixel Full Color Encoding", Dallas, Aug. 18-22, vol. 20, No. 4, 1986, pp. 215-223.

Fenney, "Texture Compression Using Low-Frequency Signal Modulation", Graphics Hardware (2003), © The Eurographics Association, 2003.

Akenine-Möller et al, "Graphics for the Masses: A Hardware Rasterization Architecture for Mobile Phones", *ACM Transactions of Graphics* (*Proceedings of ACM SIGGRAPH*), vol. 22, No. 3, Jul. 2003, pp. 801-808.

Chinese Office Action mailed Mar. 7, 2008 in corresponding CN application 200480038094.6.

Y. Linde, A. Buzo and R. Gray, "An algorithm for vector quantizer design", *IEEE Transactions on Communications*, vol. 28, pp. 84-94, Jan. 1980.

U.S. Office Action mailed Mar. 9, 2009 in related U.S. Appl. No. 10/582,689.

U.S. Office Action mailed Mar. 3, 2009 in related U.S. Appl. No. 10/583,453.

U.S. Office Action mailed Mar. 16, 2009 in related U.S. Appl. No. 10/583,454.

Said et al., "A new, Fast, and Efficient Image Codec Based on Set Partitioning in Hierarchical Trees", IEEEE Transactions on Circuits and Systems for Video Technology, vol. 6, No. 3, Jun. 1996, pp. 243-250.

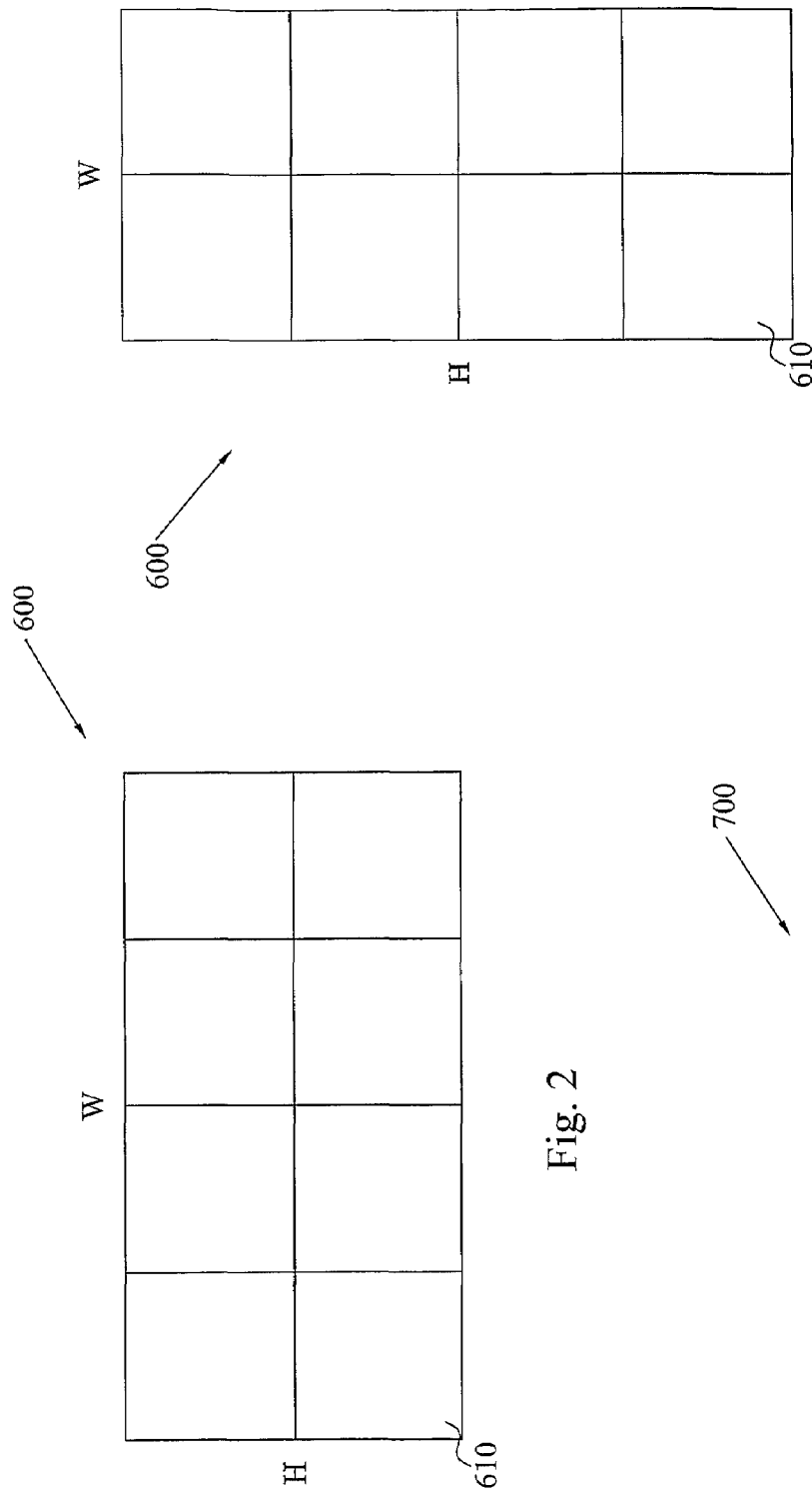

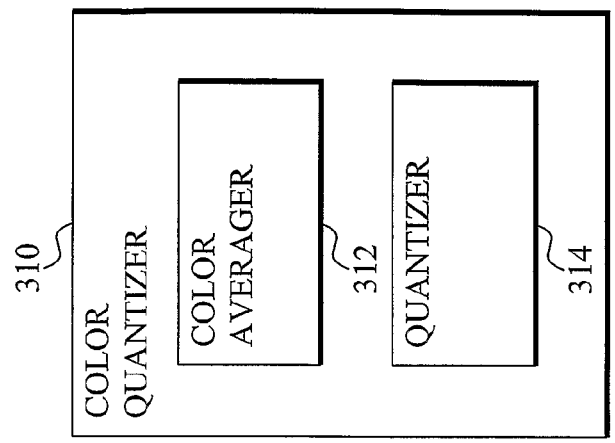
Fig. 15
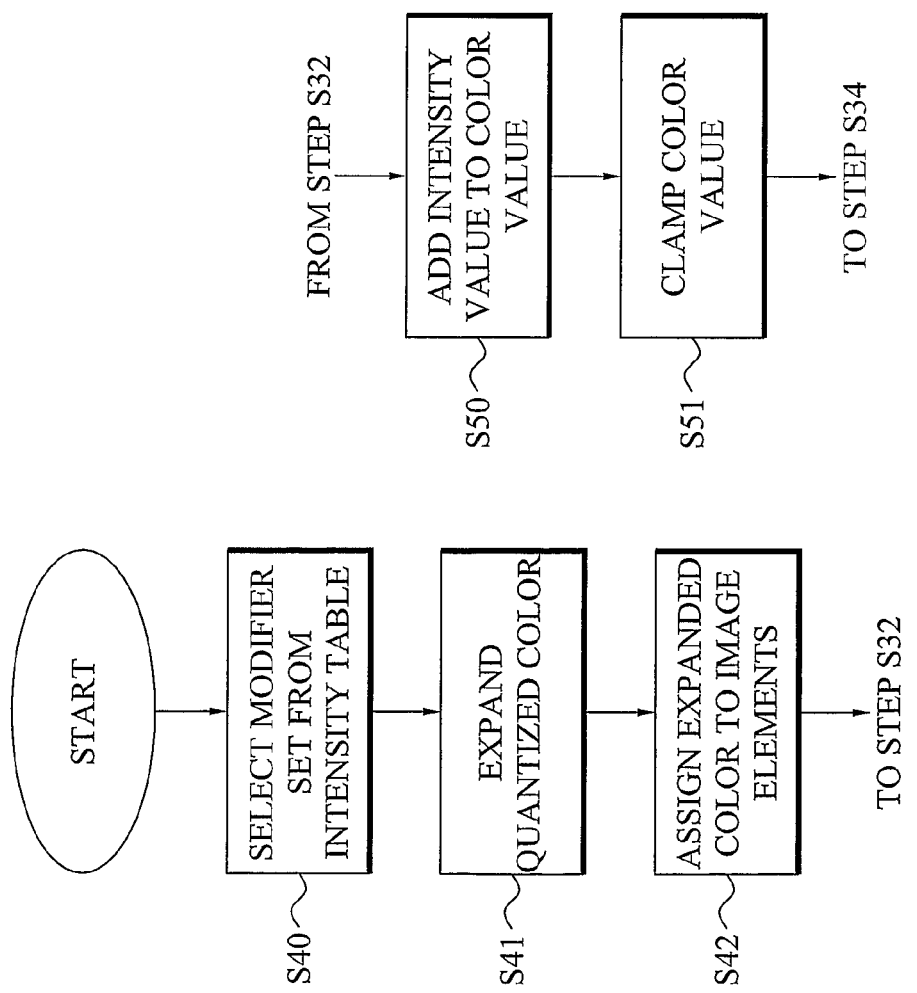
Fig. 9
Fig. 8

IMAGE PROCESSING

This application is the US national phase of international application PCT/SE2004/001120 filed 8 Jul. 2004, which designated the U.S. and claims priority to SE 0303497-2 filed 19 Dec. 2003, the entire contents of each of which are hereby incorporated by reference.

TECHNICAL FIELD

The technology disclosed herein generally refers to image processing, and in particular to methods and systems for encoding and decoding images.

BACKGROUND

Presentation and rendering of images and graphics on data processing systems and user terminals, such as computers, and in particular on mobile terminals have increased tremendously the last years. For example, three-dimensional (3D) graphics and images have a number of appealing applications on such terminals, including games, 3D maps and messaging, screen savers and man-machine interfaces.

A 3D graphics rendering process typically comprises three sub-stages. Briefly, a first stage, the application stage, creates several triangles. The corners of these triangles are transformed, projected and lit in a second stage, the geometry stage. In a third stage, the rasterization stage, images, often denoted textures, can be "glued" onto the triangles, increasing the realism of the rendered image. The third stage also performs sorting using a z-buffer.

However, rendering of images and textures, and in particular 3D images and graphics, is a computationally expensive task in terms of memory bandwidth and processing power required for the graphic systems. For example, textures are costly both in terms of memory, the textures must be placed on fast on-chip memory, and in terms of memory bandwidth, a texture can be accessed several times to draw a single pixel.

In order to reduce the bandwidth and processing power requirements, an image (texture) encoding method or system is typically employed. Such an encoding system should result in more efficient usage of expensive on-chip memory and lower memory bandwidth during rendering and, thus, in lower power consumption and/or faster rendering. This reduction in bandwidth and processing power requirements is particularly important for thin clients, such as mobile units and telephones, with a small amount of memory, little memory bandwidth and limited power (powered by batteries).

Delp and Mitchell [1] describe a simple scheme, called block truncation coding (BTC), for image encoding. Their scheme encodes gray scale images by considering a block of 4 pixels×4 pixels at a time. For each such block, two 8-bit gray scale values are generated and each pixel in the block then uses a single bit to index one of these gray scales. This results in a compression rate of 2 bits per pixel (bpp). However, BTC suffers from production of artifacts, above all in regions around edges and in low contrast areas containing a sloping gray level. Furthermore, edges in a gray scale image processed by BTC have a tendency to be ragged.

A simple extension of BTC, called color cell compression (CCC), was presented by Campbell et al. [2]. Instead of using two 8-bit gray scale values for each image block, two 8-bit values are employed as indices into a color palette. This palette comprises 256 colors represented by 8 bits for each of the R, G and B component. An 8-bit index then points at a (24-bit) color in the palette. This allows for compression of images at 2 bpp. However, this does require a memory lookup in the palette. In addition, the palette is restricted in size. The CCC scheme also introduces large color "jaggies" and poorly encodes the case where more than two colors exist in an image block.

In a patent description [3], Iourcha et al. disclose a texture compression scheme called S3TC (S3 Texture Compression) or DXTC (DirectX Texture Compression), that can be seen as an extension of CCC. An image is decomposed into a number of image blocks of 4 pixels×4 pixels. Each such image block is encoded into a bit sequence of 64 bits, thus resulting in a compression rate of 4 bpp. The 64-bit sequence comprises two basic colors or color codewords (16 bits each) and a 32-bit sequence of 2-bit indices, one index for each pixel in the image block. During decoding, a color palette of four colors is generated. The first two RGB (red, green and blue) colors of the palette correspond to the two basic colors (codewords). The two additional colors, situated between the basic colors in the RGB space, are then interpolated therefrom. Each 2-bit index then identifies, for each pixel, one of the four colors of the palette to use for that pixel.

Although, the S3TC scheme works fairly well for computer terminals, it is not well adapted for mobile units and other thin clients. Such mobile units typically only have memory busses of 16 or 32 bits at best. Thus, at least two, and possibly up to four, memory accesses are required to read out the 64-bit compressed version of an image block, if S3TC is implemented in a mobile unit. In addition, during the interpolation of the two additional colors of the color palette, multiplication by $\frac{1}{3}$ and $\frac{2}{3}$ is performed, which is not ideal in hardware. The compression using S3TC is also relatively time consuming, at least on a mobile terminal.

Akenine-Möller and Ström [4] have developed a variant of S3TC, called POOMA, which is specifically targeted for mobile phones. In POOMA, an image block of 3 pixels×2 pixels is encoded into 32 bits, giving 5.33 bpp. The encoded 32-bit representation of an image block is adapted for the memory busses of mobile phones, which typically are 32 bits at best. Thus, a pixel can be rendered using only one memory access compared to two accesses for S3TC. POOMA uses two base colors but only one additional color interpolated between the base colors, resulting in a color palette of three colors.

A major disadvantage of POOMA is the block size of 3×2 pixels. As a result, calculation of the block address for a particular pixel or texel (texture element) requires division by 3, which is not ideal for hardware design. Furthermore, the widths and heights of textures (images) in graphics are typically always a power of two, which means that a block width of 3 is inconvenient. As for S3TC, the encoding using POOMA is relatively time consuming, in particular when implemented on a mobile terminal.

Fenny [5] discloses an image-encoding scheme used in the MBX graphics hardware platform for mobile phones. This scheme uses two low-resolution images, where one image is usually a low-pass filtered version of the original image. During decoding, a bilinear magnification (upscaling) of these two images is created. Each pixel also stores a blend factor between these two upscaled images. 64 bits are used for encoding each image block and a compression rate of 2 bpp and 4 bpp are described. Information from neighboring image blocks is needed, which complicates decoding.

SUMMARY

The technology disclosed herein overcomes these and other drawbacks of the prior art arrangements.

It is a general object of the technology disclosed herein to provide an efficient image processing.

It is another object of the technology disclosed herein to provide an efficient image encoding and image decoding.

Yet another object of the technology disclosed herein is to provide image encoding and decoding adapted for usage in thin clients with low memory and memory bandwidth capacity.

A further object of the technology disclosed herein is to provide image encoding and decoding adapted for three-dimensional (3D) graphics and images.

These and other objects are met by the technology disclosed herein as defined by the accompanying patent claims.

Briefly, the technology disclosed herein involves image processing in the form of encoding (compressing) an image and decoding (decompressing) an encoded (compressed) image.

According to an example embodiment, an image to be encoded is decomposed into a number of image blocks comprising multiple image elements (pixels or texture elements, texels). An image block preferably comprises eight image elements and has a size of $2^m \times 2^n$ image elements, where m=3−n and n=0, 1, 2, 3. Each image element in a block is characterized by a color, e.g. a 12-bit RGB (red, green, blue) color. The image blocks are then encoded.

In this lossy block encoding, a color codeword is determined for the image block. The color codeword is a representation of the colors of the image elements of the image block. A preferred representation is an average value of the colors of the image elements in block, quantized into 12 bits (4 bits for each of the three color components for a RGB color). Thus, one and the same color codeword (i.e. color representation) is generated for an image block, i.e. for all the image elements of the image block. Thereafter, an intensity codeword is provided for the image block. This intensity codeword is a representation of a set of multiple intensity modifiers that are used (during decoding) for modifying or modulating the intensity of the image elements in the image block. Once the intensity codeword is provided, intensity representations for the image elements in the image block are selected. Each such intensity representation is associated with an intensity modifier from the intensity modifier set. In other words, the intensity representation allows identification of which intensity modifier from the set to use for a specific image element of the block.

The resulting encoded image block then comprises the color codeword, preferably 12 bits, the intensity codeword, preferably 4 bits, and a sequence of the intensity representations, preferably 8×2=16 bits. The resulting size of an encoded image block is, thus, only 32 bits and a compression rate of 4 bits per pixel (image element) is obtained. This small 32-bit size is well adapted for thin clients, such as mobile units and telephones, which typically have memory busses of 16 or 32 bits. As a result, only one or at worst two memory accesses are then needed to read out the encoded image block from a memory location.

In a preferred example embodiment, the intensity codeword is an intensity index allowing identification of an intensity modifier set. This index could then identify or point to the set in a table or codebook comprising several different intensity modifier sets. Each set preferably comprises four (mathematically) complementary modifier values. In such a case, the modifier sets stored in the table only have to comprise two different intensity modifier values each and then the other two (complementary) values of the set could be calculated therefrom. In addition, the intensity table preferably comprises both sets that include small intensity modifier values, which are adapted for allowing representation of smoothly changing surfaces, and sets that include large intensity modifier values, which are adapted for allowing representation of sharp edges.

During decoding, the encoded image block(s) that should be decoded is identified and fetched from e.g. a memory location. Once the correct encoded image block is identified an intensity modifier set is provided. This modifier set is provided based on the intensity codeword in the encoded image block. This set provision is preferably performed by identifying, by means of the intensity codeword, an intensity modifier set from an intensity table comprising multiple modifier sets.

Thereafter, a color representation is generated for at least one of the image elements of the image block. This color generation is performed based on the color codeword in the encoded block representation. The intensity modifier to use for the image element that should be decoded is then selected. The modifier value is selected from the provided modifier set based on the intensity representation associated with the image element and found in the representation sequence of the encoded image block. Once the correct intensity modifier value is selected, the intensity of the image element is modified with this value.

The selection of intensity modifier and modification of the intensity are preferably performed for all image elements that should be decoded in the current encoded image block. The block decoding is then preferably repeated for all image blocks that comprises image elements that should be decoded. Thereafter, a decoded representation of an original image, or a portion thereof, can be generated based on the decoded image elements and blocks.

The color representation is preferably generated by expanding the three 4-bit color components of the color codeword into three 8-bit components. The resulting 24-bit color is then assigned to the image element(s) of the image block that are to be decoded. The intensity of the image elements is preferably modified by adding or multiplying the intensity modifier to each color component, or each color component is otherwise modulated with the intensity modifier. Thereafter, the resulting intensity modified color components are clamped between a minimum and maximum threshold value.

The image encoding and decoding of the technology disclosed herein can be applied to several different types of images, including 1D, 2D and 3D "synthetic" images, photos, text, games, 3D maps and scenes, 3D messages, e.g. animated messages, screen savers, man-machine interfaces (MMIs), etc.

Due to the small (32-bit) size of an encoded image block, the technology disclosed herein is well adapted for thin clients with limited memory capacity and bandwidth. In addition, the encoding is very fast so that it can be performed also in terminals with low clock frequencies. Furthermore, the decoding can extremely simply be implemented in e.g. hardware using only a few standard components.

The technology disclosed herein offers the following advantages:

Well adapted for matching the human visual system, since the luminance component is preserved better than the chrominance components;

Gives high quality (peak signal/noise ratio) for different image types;

Hardware implementation of decoding is extremely simple;

Encoding is very fast, which enables implementations also in terminals with low clock frequencies;

Exhaustive encoding is possible at feasible speed on a computer; and

Encoded image data has a size that is suited for thin clients with limited memory capacity and bandwidth.

Other advantages offered by the technology disclosed herein will be appreciated upon reading of the below description of the example embodiments.

SHORT DESCRIPTION OF THE DRAWINGS

The technology disclosed herein together with further objects and advantages thereof, may best be understood by making reference to the following description taken together with the accompanying drawings, in which:

FIG. 2 illustrates an example embodiment of an image block;

FIG. 3 illustrates another example embodiment of an image block;

FIG. 4 illustrates an example embodiment of an encoded representation of an image block;

FIG. 8 is a flow diagram illustrating the steps of providing intensity modifier set and generating color representation of FIG. 7 in more detail;

FIG. 9 is a flow diagram illustrating the intensity modifying step of FIG. 7 in more detail;

Figure 10:
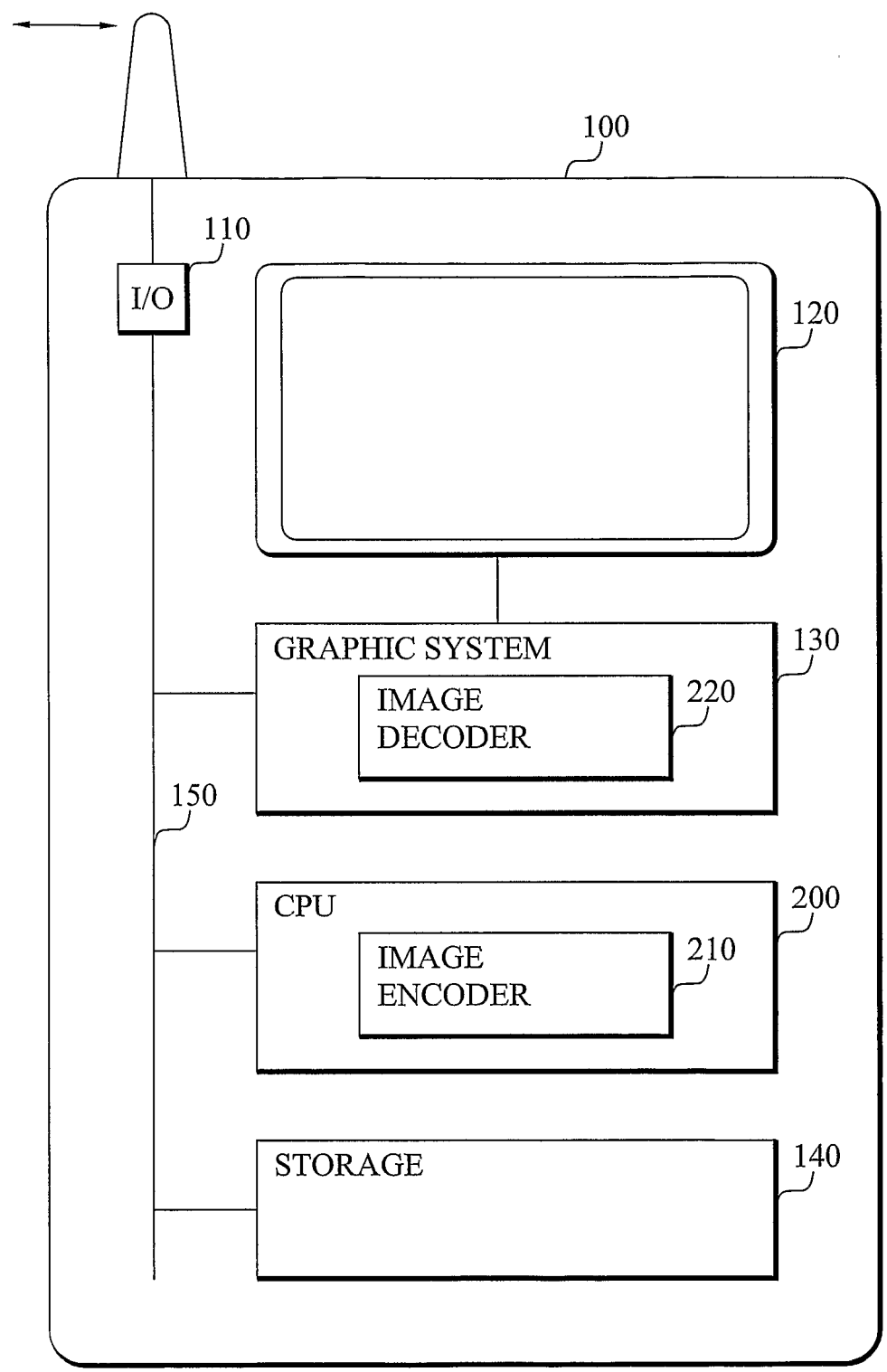
Figure 13:
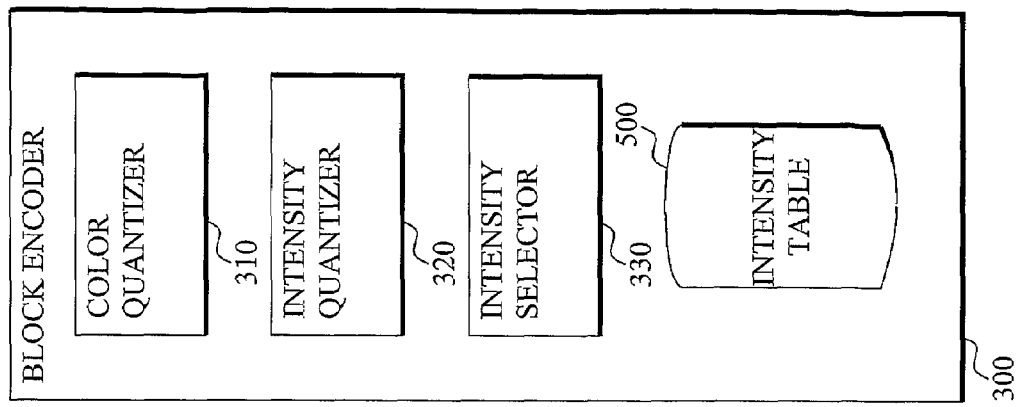
Figure 12:
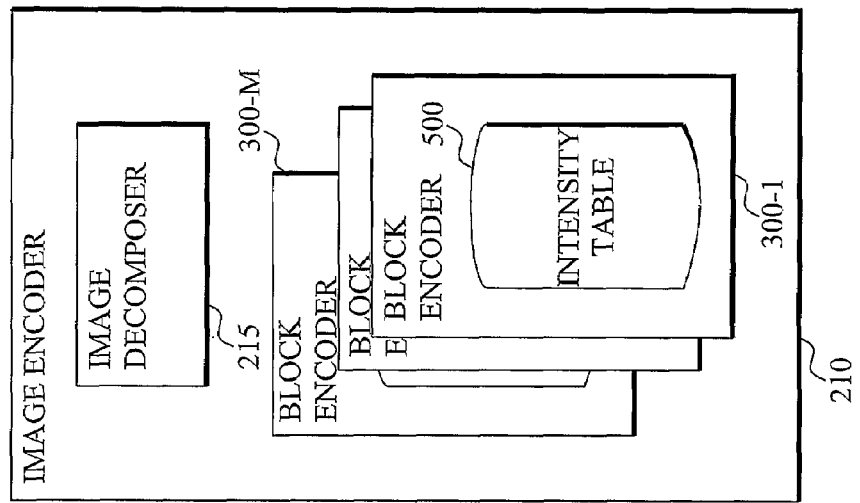
Figure 11:
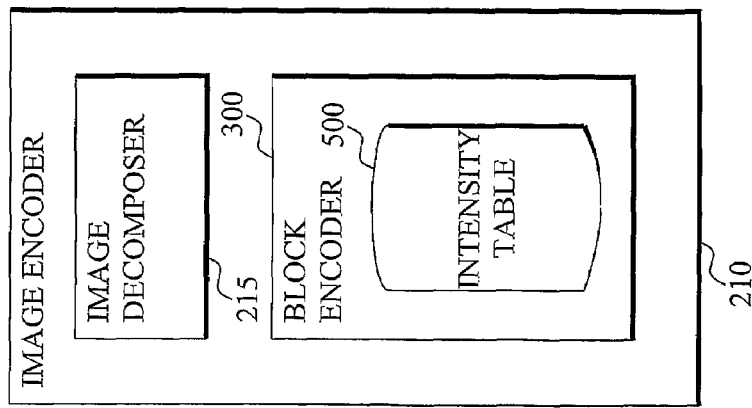
Figure 14:
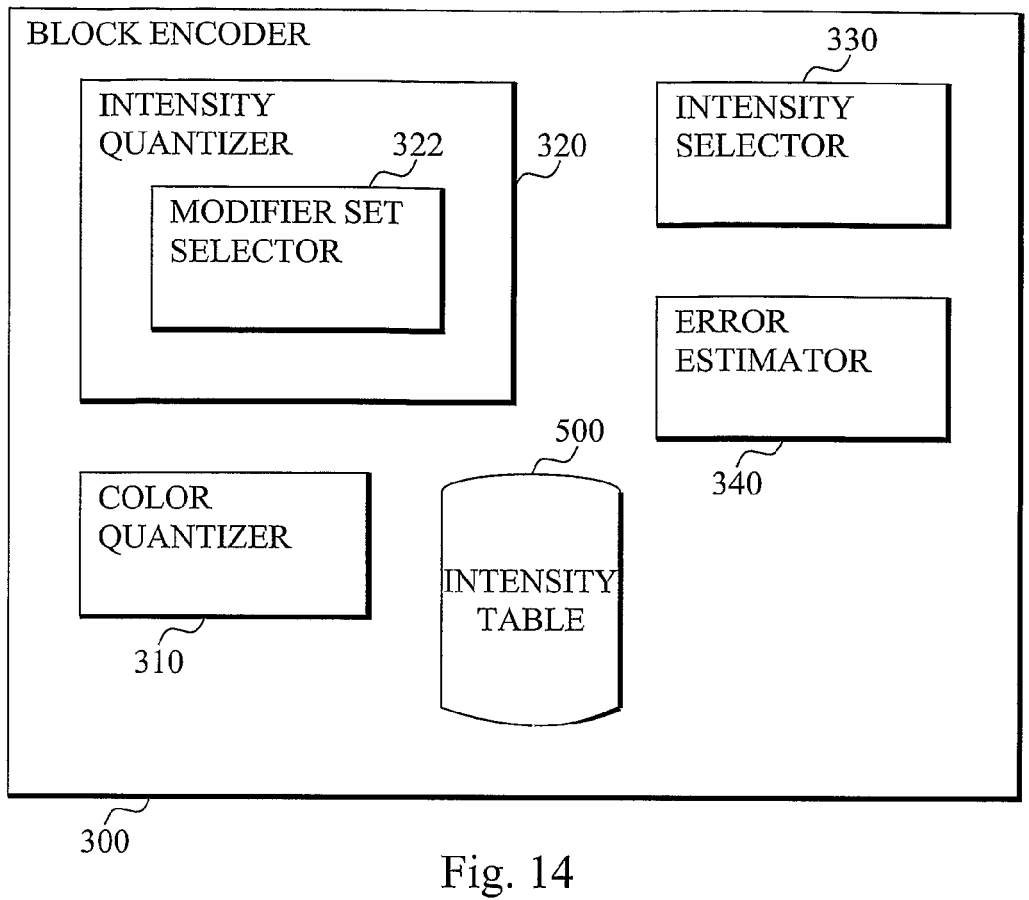
Figure 18:
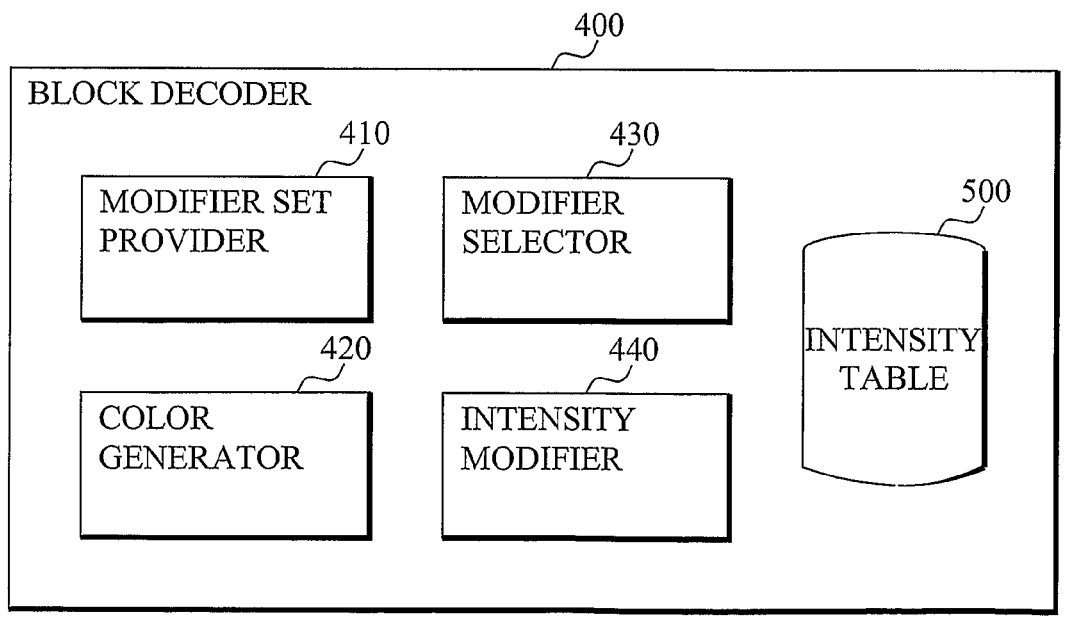
Figure 17:
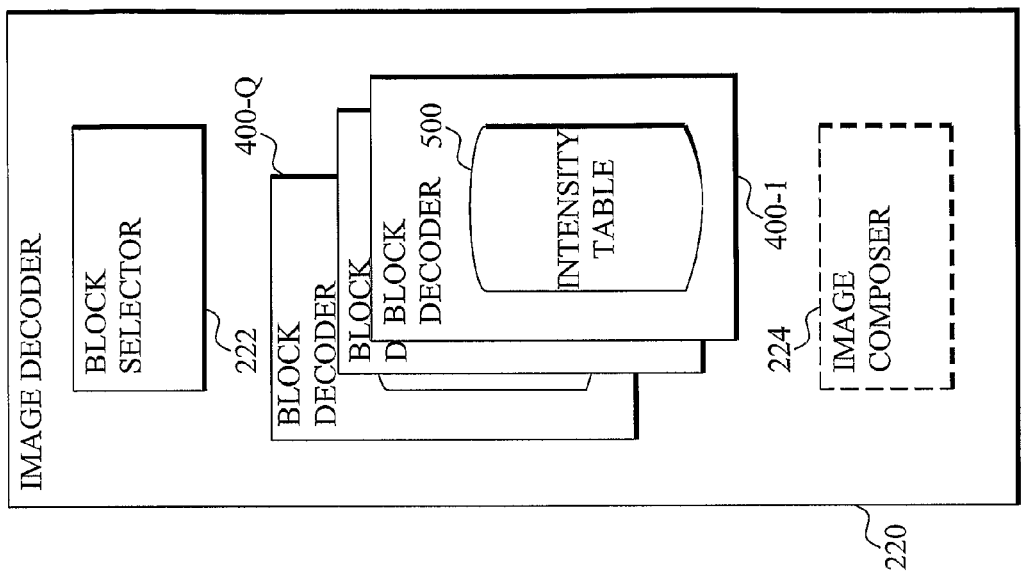
Figure 16:
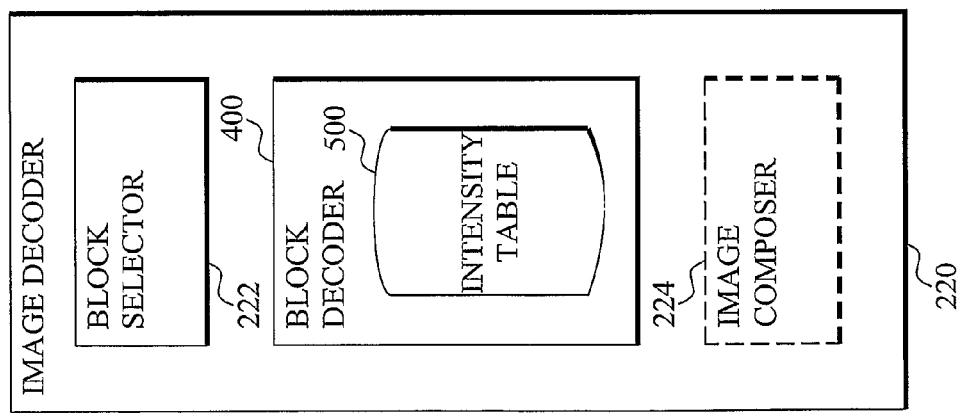
Figure 19:
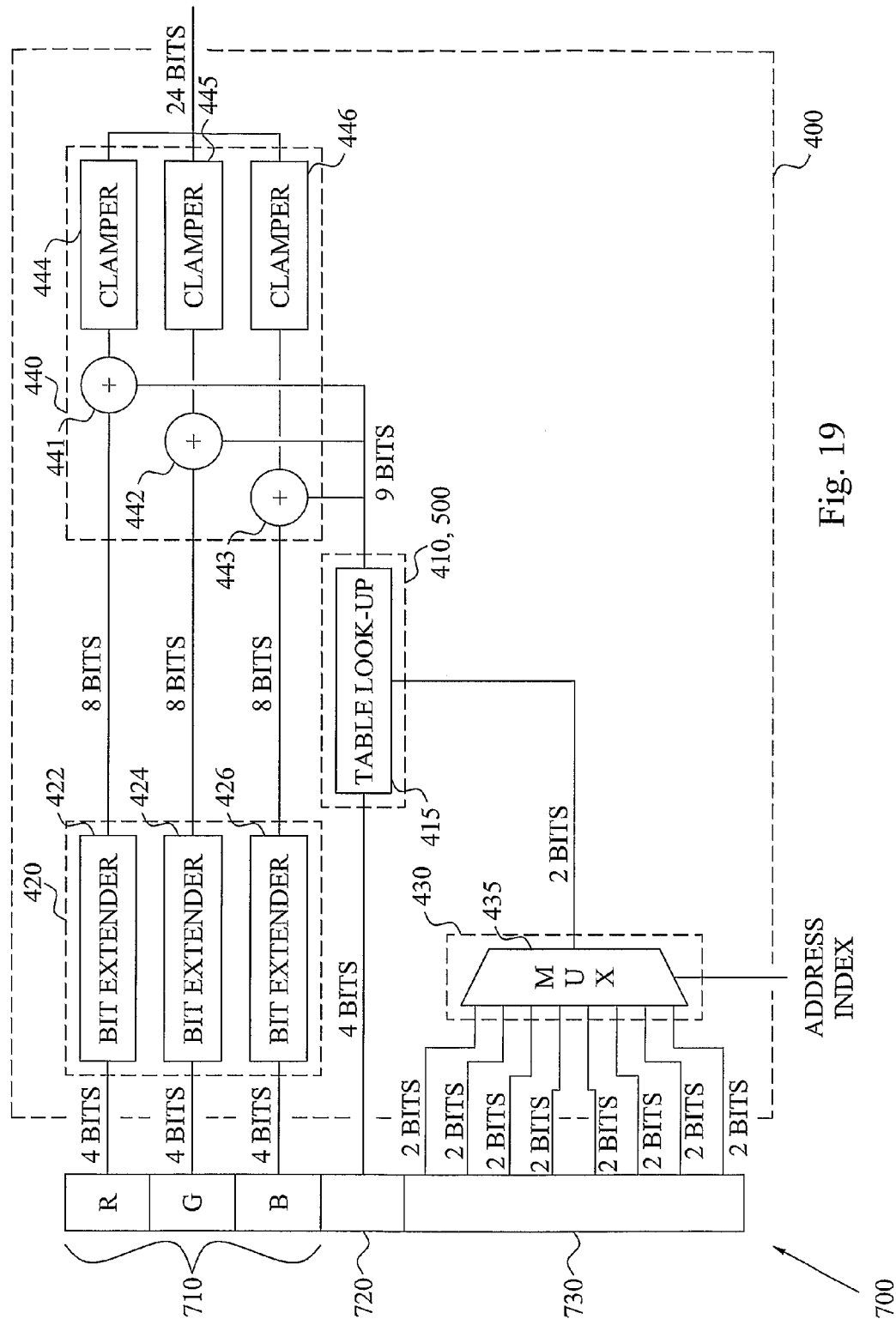
Figure 20:
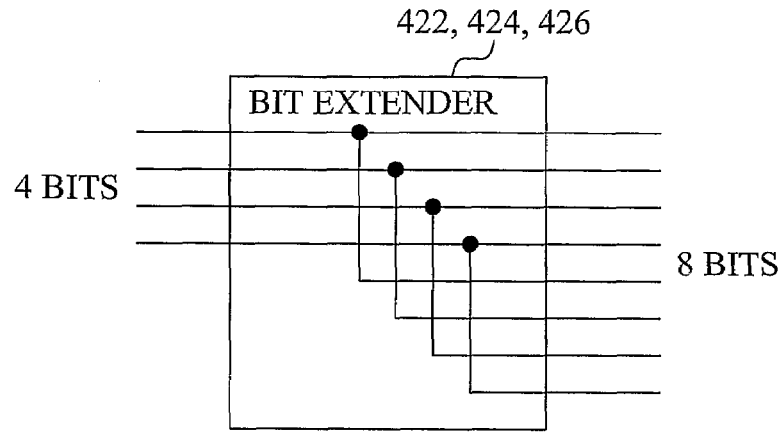
Figure 22:
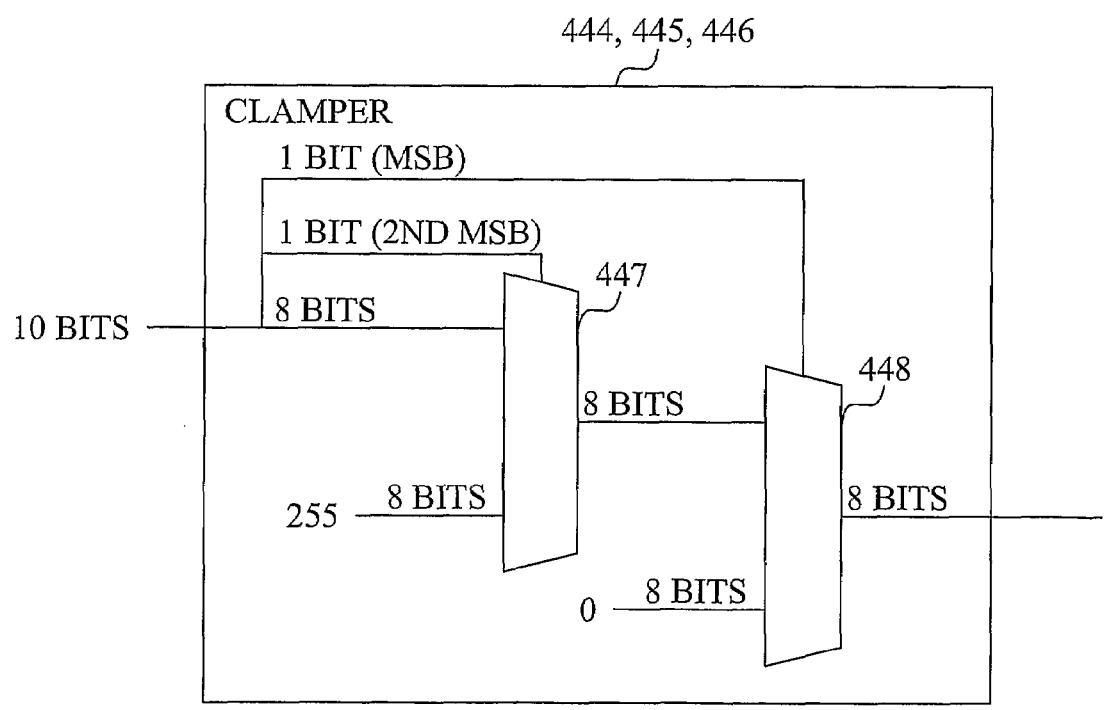
Figure 21:
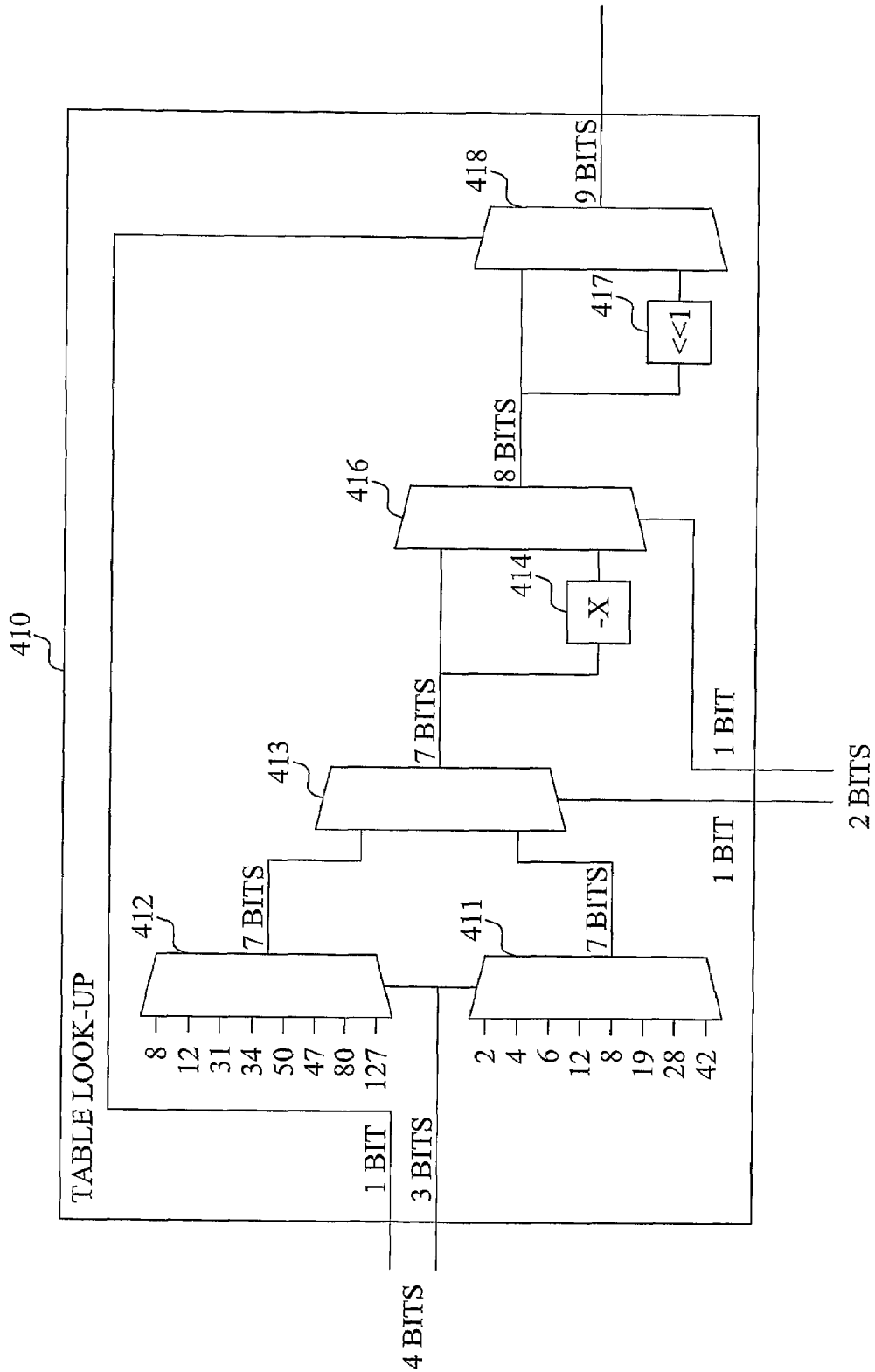

FIG. 10 schematically illustrates an example of a user terminal with an image encoder and decoder according to an example embodiment;

FIG. 11 is a block diagram schematically illustrating an example embodiment of an image encoder;

FIG. 12 is a block diagram schematically illustrating another example embodiment of an image encoder;

FIG. 13 is a block diagram schematically illustrating an example embodiment of a block encoder;

FIG. 14 is a block diagram schematically illustrating another example embodiment of a block encoder;

FIG. 15 is a block diagram schematically illustrating the color quantizer of the block encoder of FIGS. 13 and 14 in more detail;

FIG. 16 is a block diagram schematically illustrating an example embodiment of an image decoder;

FIG. 17 is a block diagram schematically illustrating another example embodiment of an image decoder;

FIG. 18 is a block diagram schematically illustrating an example embodiment of a block decoder;

FIG. 19 is a hardware block diagram schematically illustrating an example embodiment of a block decoder;

FIG. 20 is hardware block diagram illustrating an embodiment of the bit extenders of FIG. 19 in more detail;

FIG. 21 is hardware block diagram illustrating an embodiment of the table look-up of FIG. 19 in more detail; and FIG. 22 is hardware block diagram illustrating an embodiment of the dampers of FIG. 19 in more detail.

DETAILED DESCRIPTION

Throughout the drawings, the same reference characters will be used for corresponding or similar elements.

The technology disclosed herein relates to image and graphic processing, and in particular to encoding or compressing images and decoding or decompressing encoded (compressed) images.

Generally, during image encoding, an image is decomposed or divided into a number of image blocks. Each such image block then comprises multiple image elements having, among others, a certain color. The image blocks are then encoded to generate an encoded representation of the image.

When an encoded image or graphic primitive subsequently is to be rendered, e.g. displayed on a screen, the relevant image elements of the encoded image blocks are identified and decoded. These decoded image elements are then used to generate a decoded representation of the original image or graphics primitive.

The technology disclosed herein is well adapted for usage with three-dimensional (3D) graphics, such as games, 3D maps and scenes, 3D messages, e.g. animated messages, screen savers, man-machine interfaces (MMIs), etc., but is not limited thereto. Thus, the technology disclosed herein could also be employed for encoding other types of images or graphics, e.g. one-dimensional (1D) or two-dimensional (2D) images.

In 3D graphics processing, typically several triangles are created and the corresponding screen coordinates of the corners of these triangles are determined. Onto each triangle, an image (or portion of an image), or a so-called texture, is mapped ("glued"). The management of textures is, though, costly for a graphic system, both in terms of utilized memory for storage of textures and in terms of memory bandwidth during memory accesses, when textures are fetched from the memory. This is a problem particularly for thin clients, such as mobile units and telephones, with limited memory capacity and bandwidth. As a consequence, a texture or image encoding scheme is often employed. In such a scheme, a texture is typically decomposed or divided into a number of image blocks comprising multiple texels. The image blocks are then encoded and stored in a memory. Note that the size of an encoded (version of an) image block is smaller than the corresponding size of the uncoded version of the image block.

For the technology disclosed herein the expression "image element" refers to an element in an image block or encoded representation of an image block. This image block, in turn, corresponds to a portion of an image or texture. Thus, according to the technology disclosed herein, an image element could be a texel (texture element) of a (1D, 2D or 3D) texture or a pixel of a (1D, 2D or 3D) image. Generally, an image element is characterized by certain image-element properties, such as a color value. Furthermore, in the following, the term "image" is used to denote any 1D, 2D or 3D image or texture that can be encoded and decoded by means of the technology disclosed herein, including but not limited to photos, game type textures, text, drawings, etc.

Figure 1:
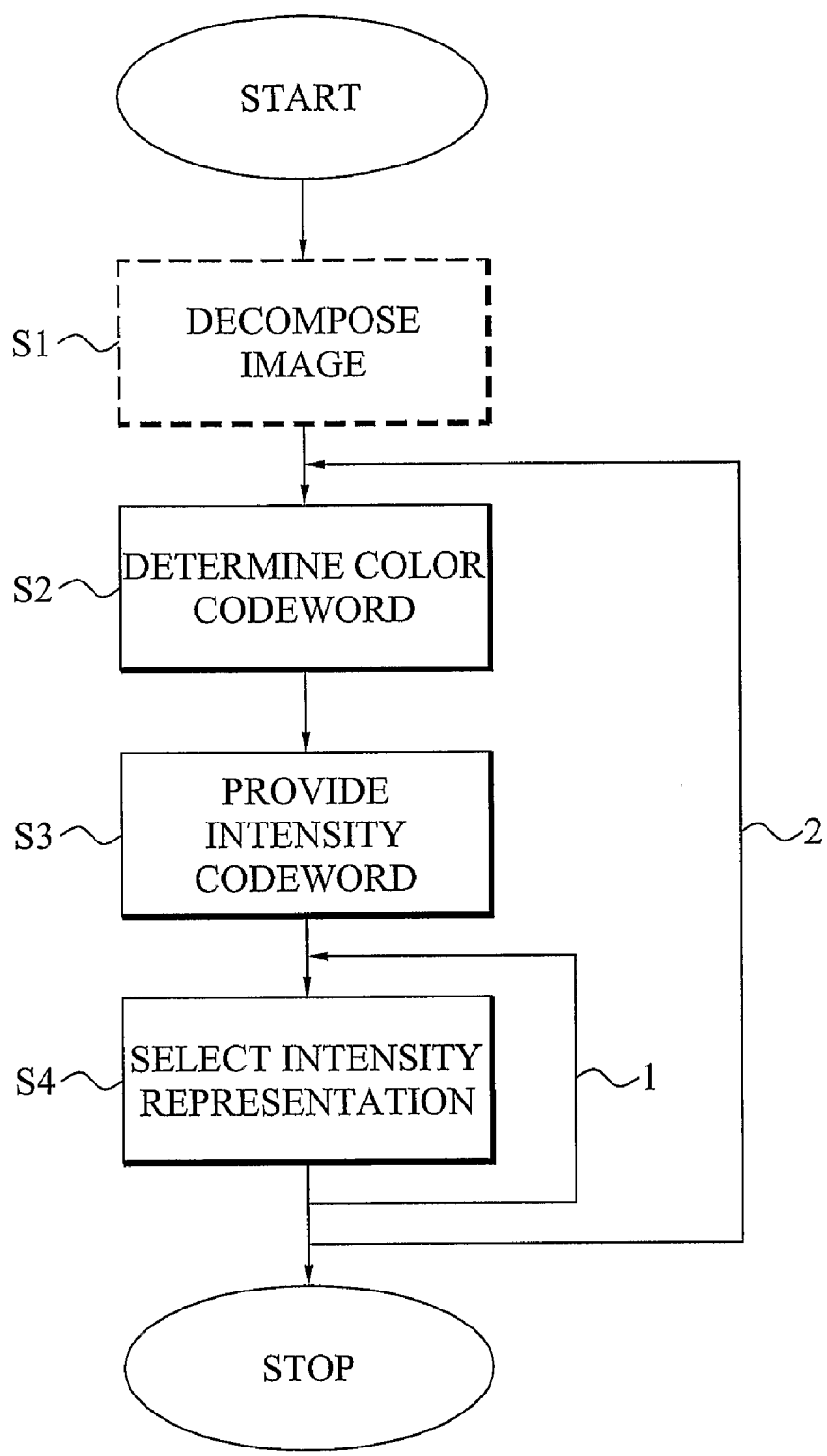
FIG. 1 is a flow diagram illustrating an image encoding method according to an example embodiment.

FIG. 1 illustrates a (lossy) method of encoding an image according to an example embodiment. In a first step S1, the image is decomposed or divided into a number of image blocks. Each such image block then comprises multiple image elements. In a preferred example embodiment, an image block comprises eight image elements (pixels or texels) and has a size of $2^m \times 2^n$ image elements, where $m=3-n$ and $n=0, 1, 2, 3$. More preferably, n is 1 or 2. FIGS. 2 and 3 schematically illustrate two examples of an image block 600 with eight image elements 610 according to the technology disclosed herein. In FIG. 2, the height is two image elements 610 and the width is four image elements 610, i.e. m=1 and n=2, whereas for the image block 600 in FIG. 3 m=2 and n=1. Returning to FIG. 1, the whole image block is preferably decomposed into (non-overlapping) image blocks in step S1. However, in some applications, only a portion of an image is encoded and, thus, only this portion is decomposed into image blocks.

The following steps S2 to S4 perform an encoding or compression of the image blocks. Firstly, in step S2, a color codeword is determined for an image block. This color codeword is a representation of the colors of the image elements in the image block. In a preferred embodiment, the color codeword is a representation of an average color of the image elements of the block. The color could be a RGB (Red, Green, Blue) color, a color in the YUV space or YCrCb space, or any other proprietary color space used in image and graphics processing and management. The color codeword is preferably in the same color format (space) as the image. However, in some cases, it may be useful to convert the image to a different color format, i.e. having the color codeword in a first color space and the original image in a second different color space. The color codeword is preferably a 12-bit color-representation sequence. For example, a RGB color codeword could comprise 4 bits for the red color component, 4 bits for the green component and 4 bits for the blue component. Correspondingly, a YUV color codeword could include 6 bits, 3 bits and 3 bits, respectively, for the three different components.

Note that one and the same color codeword (i.e. color representation) is generated for an image block, i.e. for all the image elements of the image block.

Thereafter, an intensity codeword is provided in step S3. This intensity codeword is a representation of a set of multiple intensity modifiers that are used (during decoding) for modifying the intensity of the image elements in the image block.

In a preferred example embodiment, the intensity codeword is an intensity index allowing identification of an intensity modifier set. This index could then identify or point to the set in a table or codebook comprising several different intensity modifier sets. Each set comprises two or more intensity modifier values, preferably at least four modifier values. In addition, the modifier values of a set are preferably mathematically complementary values, i.e. each set is preferably symmetrical. For example, a possible intensity modifier set could be [−a, −b, b, a], where a and b are positive integers a>b.

The intensity table preferably comprises sets including small intensity modifier values, which are adapted for allowing representation of smoothly changing surfaces. In addition, the table preferably also comprises sets that include large intensity modifier values, which are adapted for allowing representation of sharp edges.

The actual intensity modifier values of the sets in the table can be found by starting with random values and then optimizing these values using a number of different optimization schemes and algorithms, such as versions of the LBG-algorithm (Linde, Buzo and Gray) [6], simulated annealing and coordinate search, which are known to a person skilled in the art. A handful of images of different types e.g. photos, game type textures, text, etc., can be used as raining data.

In order to make a hardware implementation of the intensity table less expensive, the intensity modifiers of a set can be forced to be symmetrical, as was discussed above, and/or the intensity modifiers of a given set could be a copy of intensity modifiers of another set modified by a factor, e.g. two.

Table 1 illustrates a presently preferred example of an intensity table comprising 16 sets of intensity modifiers, with four modifier values in each set.

TABLE 1

| Set | Codeword | Intensity modifier value | | | |
|---|---|---|---|---|---|
| 1 | $0000_{bin}$ | −8 | −2 | 2 | 8 |
| 2 | $0001_{bin}$ | −12 | −4 | 4 | 12 |
| 3 | $0010_{bin}$ | −31 | −6 | 6 | 31 |
| 4 | $0011_{bin}$ | −34 | −12 | 12 | 34 |
| 5 | $0100_{bin}$ | −50 | −8 | 8 | 50 |
| 6 | $0101_{bin}$ | −47 | −19 | 19 | 47 |
| 7 | $0110_{bin}$ | −80 | −28 | 28 | 80 |
| 8 | $0111_{bin}$ | −127 | −42 | 42 | 127 |
| 9 | $1000_{bin}$ | −16 | −4 | 4 | 16 |
| 10 | $1001_{bin}$ | −24 | −8 | 8 | 24 |
| 11 | $1010_{bin}$ | −62 | −12 | 12 | 62 |
| 12 | $1011_{bin}$ | −68 | −24 | 24 | 68 |
| 13 | $1100_{bin}$ | −100 | −16 | 16 | 100 |
| 14 | $1101_{bin}$ | −94 | −38 | 38 | 94 |
| 15 | $1110_{bin}$ | −160 | −56 | 56 | 160 |
| 16 | $1111_{bin}$ | −254 | −84 | 84 | 254 |

In Table 1, the intensity modifier sets 9-16 are a copy of sets 1-8 multiplied by of two.

If the intensity table comprises at most 16 different intensity modifier set, the intensity codeword is preferably a 4-bit index ($0000_{bin}$-$1111_{bin}$) identifying one of the (16) sets, e.g. [−8, −2, 2, 8] for codeword $0000_{bin}$ (0000 base 2), of the table. Due to careful choice of the modifier values in the sets (symmetrical sets and half of the sets are a factor two of the remaining half), the entire Table 1 can be reconstructed using only 16 modifier values, and the remaining 48 values could be calculated therefrom.

The technology disclosed herein is, though, not limited to usage of Table 1, but could use other tables with other intensity modifier sets and values. Furthermore, for more or less than 16 sets in a table, the size of the intensity codeword might have to be changed. For example, if the table comprises two (3-4, 5-8 or more than 16) intensity modifier sets, the codeword size could be limited to one bit (two bits, three bits or more than four bits). In addition, the number of intensity modifier values per set could differ from four, e.g. five values could be used per set, giving an example of [−8, −2, 0, 2, 8]. The intensity values of the sets in the table could be determined using several different types of images as training data, as was discussed above. However, if only a specific image type is to be encoded the modifier values could be determined using training data corresponding to that image type, i.e. giving an intensity table dedicated for a specific image type. It could also be possible to have an intensity table with intensity modifier values adapted for a specific image. In these cases, i.e. table dedicated for image or image type, it might be necessary to include the intensity modifier values of the table in the compressed file of encoded image blocks or otherwise associate them therewith.

In addition, the intensity codeword does not have to be an index or pointer to an intensity modifier set in a table, but could actually be an intensity modifier set itself, e.g. comprises two modifier values, such as 2 and 8, and where the other modifier values, such as −2 and −8, can be determined from these two values.

Note that one and the same intensity modifier set is used for the image block. Once, the intensity codeword is provided in step S3, a next step S4 selects intensity representations for the image elements in the image block. Each such intensity representation is associated with one intensity modifier value from the intensity modifier set provided in step S3. In other words, the intensity representation allows identification of which intensity modifier of the set to use for a specific image element of the block.

In the case of an intensity modifier set comprising four modifier values, such as −8, −2, 2, 8, the intensity representation could be a 2-bit sequence identifying one of these four values, e.g. $11_{bin}$ corresponds to −8, $10_{bin}$ corresponds to −2, $00_{bin}$ corresponds to 2 and $01_{bin}$ corresponds to 8. If more than four intensity modifier values are used per set, then more than two bits are required for each intensity element to identify correct modifier.

Step S4 is preferably repeated for all image elements in the image block (schematically illustrated by line 1). The result of the encoding of steps S2 to S4 is an encoded image block or more precisely an encoded (compressed) representation of the image block. Such an encoded block representation 700 is illustrated in FIG. 4. The representation 700 (encoded image block) comprises the color codeword 710, the intensity codeword 720 and a sequence or bitmap 730 of intensity representations (preferably one intensity representation for each image element in the block). Note that the mutual order of the color codeword 710, intensity codeword 720 and intensity-representation sequence 730 of the encoded image block 700 may differ from what is illustrated in the figure.

If the image block comprises eight image elements (see e.g. FIGS. 2 and 3) and each intensity representation is 2 bits, the size of the sequence 730 is 16 bits. Furthermore, assume that corresponding sizes of the color and intensity codewords are 12 and 4 bits, respectively. The total size of the encoded representation 700 of the image block is then 32 bits and a compression rate of 4 bits per pixel (image element) (bpp) is obtained. This small (32-bit) size of the representation 700 is well adapted for thin clients, such as mobile units, which typically have memory busses of 16 or 32 bits. As a result, only one or at worst two memory accesses are then needed to read out the encoded representation 700.

Returning to FIG. 1, steps S2 to S4 are preferably repeated for all image blocks provided during the decomposing of step S1 (schematically illustrated by line 2). The result is then a sequence or file of encoded image blocks. The resulting encoded image blocks (encoded representations of the image blocks) could be ordered in a file from left to right and top to bottom in the same order in which they were broken down in the block decomposing of step S1. The method then ends.

The encoded image could then be provided to a memory for storage therein until a subsequent rendering, e.g. display, of the image. Furthermore, the encoded image could be provided as a signal of encoded block representations to a transmitter for (wireless or wired) transmission to another unit.

Figure 5:
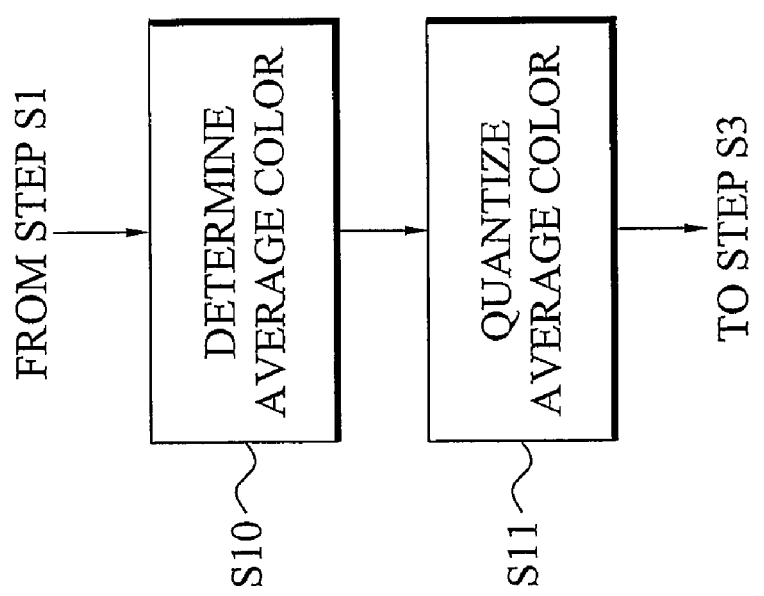
FIG. 5 is flow diagram illustrating the color codeword determining step of FIG. 1 in more detail.

FIG. 5 illustrates an embodiment of step S2 of FIG. 1 in more detail. In step S10, an average color of the image elements in the image block is determined. In the following, it is assumed that the color of a pixel or texel (image element) of an image is represented by 24 bits of RGB color, i.e. 8 bits of the red component, 8 bits or the green component and 8 bits of the blue component. However, the technology disclosed herein is not limited to this particular example, but can be applicable to any color representation of pixels and texels. The average color $(\overline{R}, \overline{G}, \overline{B})$ is then determined as:

$$\overline{R} = \frac{1}{N}\sum_{i=1}^{N} R_i \quad (1)$$

$$\overline{G} = \frac{1}{N}\sum_{i=1}^{N} G_i$$

$$\overline{B} = \frac{1}{N}\sum_{i=1}^{N} B_i,$$

where $R_i$, $G_i$, $B_i$ are the R, G, B component of image element i and N is the total number of image elements in the image block.

Once the average color $(\overline{R}, \overline{G}, \overline{B})$ is determined in step S10, a next step S11 quantizes the average color. The (24-bit) average color is preferably quantized into a 12-bit sequence (color codeword). In other words, each 8-bit average component is quantized into a 4-bit average component. For example, if the average color $\overline{R}, \overline{G}, \overline{B}$ is calculated to:

$$\begin{bmatrix} 178 \\ 88 \\ 21 \end{bmatrix} = \begin{bmatrix} B2 \\ 58 \\ 15 \end{bmatrix}_{hex} = \begin{bmatrix} 10110010 \\ 01011000 \\ 00010101 \end{bmatrix}_{bin},$$

a 4-bit quantized version $(\hat{\overline{R}}, \hat{\overline{G}}, \hat{\overline{B}})$ could be generated from:

$$\begin{bmatrix} 170 \\ 85 \\ 17 \end{bmatrix} = \begin{bmatrix} AA \\ 55 \\ 11 \end{bmatrix}_{hex} = \begin{bmatrix} 10101010 \\ 01010101 \\ 00010001 \end{bmatrix}_{bin},$$

i.e. $[A, 5, 1]_{hex} = [1010, 0101, 0001]_{bin}$ could be used as a (12-bit) color codeword. The method then continues to step S3 of FIG. 1.

Figure 6:
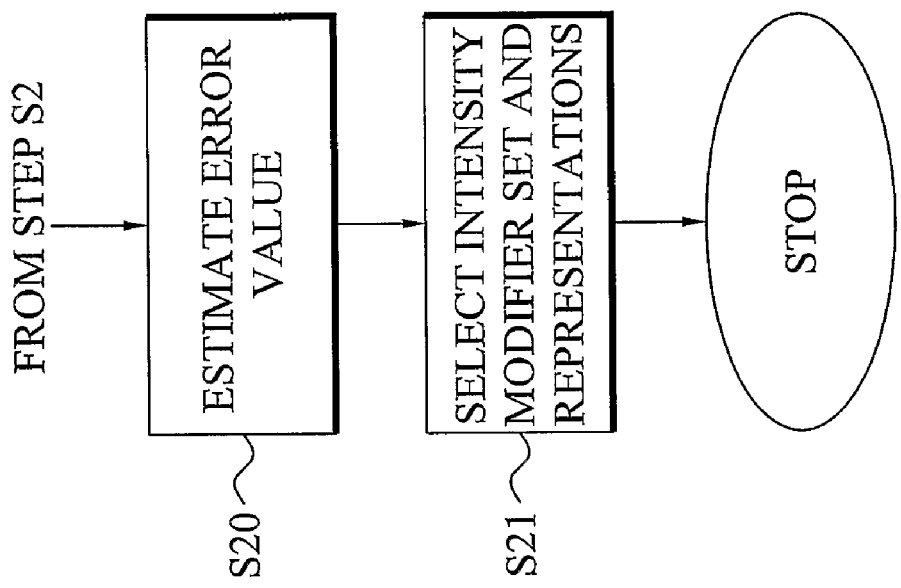
FIG. 6 is flow diagram illustrating the intensity codeword providing step and intensity representation selecting step of FIG. 1 in more detail.

FIG. 6 illustrates an embodiment of steps S3 and S4 of FIG. 1 in more detail. Step S20 investigates the different intensity modifier sets of the table and the different modifier values of the sets and calculates an error value for each such modifier set and modifier value test. Based on these error values, a modifier set and intensity modifier values of the set that results in a smallest error value is selected in step S21. This is described in more detail below. The method then ends.

In the following, encoding of image blocks is further discussed in more detail in connection with three different examples. In these examples, an intensity table corresponding to Table 1 is used.

Simple Encoding

In order to encode an image block according to this example embodiment, basically a color codeword and a correct intensity modifier set are selected. Once this is done, encoding of each image element in the image block is done by trying all the four intensity modifiers of the set and calculating the error. Assume that the original (24-bit) color of an image element is (R, G, B) and that the color codeword (quantized average color, 12 bits) is $$(\hat{\overline{R}}, \hat{\overline{G}}, \hat{\overline{B}})$$

and that the chosen modifier set is [−a, −b, b, a]. An error value could then be determined as:

$$\varepsilon^2 = (\hat{R} + \alpha - R)^2 + (\hat{G} + \alpha - G)^2 + (\hat{B} + \alpha - B)^2, \quad (2)$$

where $\alpha \in [-a, -b, b, a]$. For each of the image elements in the image block, the $\alpha$ that minimizes the error $\epsilon^2$ is selected. This could be implemented by calculating the error value for a first selection of modifier values for the image elements and store this first error value (and the chosen selection of modifier values). Thereafter, an error value is calculated for a different selection of modifier values. This error value is then compared to the stored value. If it is smaller than the stored value, the stored value is replaced by this new error value and the modifier values used in the calculation of this error value are also stored. This is then repeated for all combinations of modifiers and sets.

Equation (2) will give the best performance in terms of Peak Signal/Noise Ratio (PSNR), since it will minimize the mean square error in the image. Perceptually, however, it may not produce the best result. For some pixels (image elements) $p_1$ and $p_2$, where $p_1$ seems brighter than $p_2$ in the original image, $p_2$ may seem brighter than $p_1$ in a decoded version of the image. The reason for this is that the red, green and blue components do not give equal contributions to what the human visual system perceives as intensity. Since the green component gives a disproportionate contribution to the perception of intensity, its approximation should be represented in higher precision (more accurate) than those of red and blue. As a result, a weighted error value could be employed, such as:

$$\varepsilon^2 = w_R(\hat{R} + \alpha - R)^2 + w_G(\hat{G} + \alpha - G)^2 + w_B(\hat{B} + \alpha - B)^2, \quad (3)$$

where $w_R$, $w_G$, $w_B$ are different weights for the color components. In addition, $w_G$ is preferably larger than $w_R$ and $w_B$. For example, $$w_R = \frac{5}{16}, \quad w_G = \frac{9}{16} \text{ and } w_B = \frac{2}{16},$$

or $w_R = 0.299$, $w_G = 0.587$ and $w_B = 0.114$.

In this simple encoding, an average color of eight image elements in the block, quantized to 4 bits per color component, is used as color codeword. The correct intensity modifier set is then chosen by exhaustive search, i.e. all the 16 sets in the table are tried, and the set that minimizes the error value is selected. This requires 16×4=64 evaluations per image element. If weights are $$w_R = \frac{5}{16}, \quad w_G = \frac{9}{16} \text{ and } w_B = \frac{2}{16},$$

integer arithmetics can be used and the encoding becomes fast. For this selection of weights, encoding of an image of 128×128 pixels (image elements) using the simple encoding takes around 60 ms on a 1.2 GHz PC laptop.

Exhaustive Encoding

In the simple encoding described above, the quantized average color was simply used as a representation (color codeword) of the colors of the image elements in the image block. In this example embodiment of the exhaustive encoding, both the colors and the intensity modifier sets (including the modifier values) are chosen, i.e. every possible combination is tried. For a given image element, a further iteration through all 12 bits of color is added in addition to the previous iteration of all 4 bits of intensity modifier set and the 2 bits of intensity representation, which together gives $2^{18}$ steps. Encoding an image of 128×128 pixels takes approximately 5 minutes using the same PC laptop as for the simple compression. Although this might be far too long for run-time applications, it is not prohibitive for off-line encoding. Comparing the results from the exhaustive encoding with the ones from the simple encoding above shows a difference in PSNR of approximately 1.5 dB. Visually the images differ in that some areas in the images encoded with the simple encoding scheme show color shifts. Single image blocks in otherwise gray areas suddenly get a slight green shade. The reason for this that in the simple scheme the R, G and B components of the color codeword are quantized individually, which is suboptimal.

Combined Quantization

As for the simple encoding scheme, this example embodiment starts with a (24-bit) average color ($\overline{R}$, $\overline{G}$, $\overline{B}$), but the color components of this average color are quantized together with the intensity components, i.e. selection of intensity modifier sets and values.

If $R_{low}$ and $R_{high}$ denote the 4-bit quantization levels or values that are directly below and above $\overline{R}$, respectively so that $R_{low} \leq \overline{R} \leq R_{high}$. The task is then to choose $$\hat{R}$$

as either $R_{low}$ or $R_{high}$. The same is true for the green and blue components.

Firstly, the error value is calculated with $$(\hat{R}, \hat{G}, \hat{B}) = (R_{low}, G_{low}, B_{low}):$$

$$\epsilon^2 = (R_{low} + \alpha - \overline{R})^2 + (G_{low} + \alpha - \overline{G})^2 + (B_{low} + \alpha - \overline{B})^2. \quad (4)$$

This can be simplified into:

$$\epsilon^2 = (\delta_R + \alpha)^2 + (\delta_G + \alpha)^2 + (\delta_B + \alpha)^2, \quad (5)$$

where $\delta_R = R_{low} - \overline{R}$, $\delta_G = G_{low} - \overline{G}$ and $\delta_B = B_{low} - \overline{B}$. Further assume that $\alpha$ (the intensity modifier) can be chosen freely, i.e. is equal to the optimal $$\alpha = -\frac{\delta_R + \delta_G + \delta_B}{3}.$$

Inserting this optimal $\alpha$ into equation (5) gives after simplification:

$$\varepsilon^2 = \frac{2}{3}(\delta_R^2 + \delta_G^2 + \delta_B^2 - \delta_R\delta_G - \delta_R\delta_B - \delta_G\delta_B) = \frac{2}{3}\xi, \quad (6)$$

where $\xi$ is the expression in the brackets.

However, if the higher value is instead chosen for the red component, i.e.

$$(\hat{\bar{R}}, \hat{\bar{G}}, \hat{\bar{B}}) = (R_{high}, G_{low}, B_{low}),$$

and the fact that $R_{high}-\bar{R}=17+\delta_R$ is used, equation (5) can be rewritten as:

$$\epsilon^2 = ((\delta_R+17)+\alpha)^2 + (\delta_G+\alpha)^2 + (\delta_B+\alpha)^2. \quad (7)$$

This expression can further be simplified, by inserting the optimal $$\alpha = -\frac{\delta_R + 17 + \delta_G + \delta_B}{3}$$

for this case, into:

$$\varepsilon^2 = \frac{2}{3}\begin{pmatrix} \delta_R^2 + \delta_G^2 + \delta_B^2 - \delta_R\delta_G - \delta_R\delta_B - \\ \delta_G\delta_B + 17^2 + 17\times 2\delta_R - \delta_G - \delta_B \end{pmatrix} \quad (8)$$

$$= \frac{2}{3}(\xi + 17[17 + 2\delta_R - \delta_G - \delta_B]).$$

In order to determine which of these two quantized colors (color codewords) $(R_{low}, G_{low}, B_{low})$ or $(R_{high}, G_{low}, B_{low})$ is the best, i.e. gives the smallest error value, the extra expression in the straight brackets of equation (8) is investigated. In other words, if $17+2\delta_R-\delta_G-\delta_B<0$, $(R_{high}, G_{low}, B_{low})$ should be chosen, else $(R_{low}, G_{low}, B_{low})$ is chosen (in the case $17+2\delta_R-\delta_G-\delta_B=0$, either codeword could be chosen). This procedure is then repeated for all possible combinations of low and high quantizations for the three color components, i.e. for all neighboring quantized colors of the average color. The result is presented in Table 2 below.

TABLE 2

| Color codeword | Error value $\epsilon^2$ |
| --- | --- |
| $R_{low}, G_{low}, B_{low}$ | $\frac{2}{3}\xi$ |
| $R_{high}, G_{low}, B_{low}$ | $\frac{2}{3}(\xi + 17[17 + 2\delta_R - \delta_G - \delta_B])$ |
| $R_{low}, G_{high}, B_{low}$ | $\frac{2}{3}(\xi + 17[17 + 2\delta_G - \delta_R - \delta_B])$ |
| $R_{low}, G_{low}, B_{high}$ | $\frac{2}{3}(\xi + 17[17 + 2\delta_B - \delta_R - \delta_G])$ |
| $R_{low}, G_{high}, B_{high}$ | $\frac{2}{3}(\xi + 17[17 - 2\delta_R + \delta_G + \delta_B])$ |
| $R_{high}, G_{low}, B_{high}$ | $\frac{2}{3}(\xi + 17[17 - 2\delta_G + \delta_R + \delta_B])$ |
| $R_{high}, G_{high}, B_{low}$ | $\frac{2}{3}(\xi + 17[17 - 2\delta_B + \delta_R + \delta_G])$ |
| $R_{high}, G_{high}, B_{high}$ | $\frac{2}{3}\xi$ |

Note that $\xi$ is not required to be explicitly calculated, only the expressions (error representations) in the straight brackets of Table 2 have to be calculated in order to select the quantization levels (color codeword) to use. Further note that color codeword $(R_{low}, G_{low}, B_{low})$ and $(R_{high}, G_{high}, B_{high})$ give the same error value. This is under the assumption that any $\alpha$ (intensity modifier value) can be reached. In reality, however, $\alpha$ is limited to the intensity modifier values of the used modifier set(s), e.g. the modifier values of Table 1. According to Table 1, smaller modifier values ($\alpha$) can be specified with greater accuracy than larger values, which means that it is better to choose $(R_{high}, G_{high}, B_{high})$ rather than $(R_{low}, G_{low}, B_{low})$ if $(\bar{R}, \bar{G}, \bar{B})$ is closer to $(R_{high}, G_{high}, B_{high})$ than $(R_{low}, G_{low}, B_{low})$, and vice versa. The combined quantization of this example embodiment increases the PSNR with about 1 dB compared to the simple encoding. Thus, the PSNR is only about 0.5 dB lower than the result from the (optimal) exhaustive encoding scheme. The total encoding time was not measurably changed compared with the simple encoding, i.e. an image of 128×128 pixels is still compressed in about 60 ins.

It is also possible to build a table corresponding to Table 2 using the perceptually weighted error measure from equation (3). The optimal $\alpha$ is then $$\alpha = -\frac{w_R^2\delta_R + w_G^2\delta_G + w_B^2\delta_B}{w_R^2 + w_G^2 + w_B^2} \text{ for } (\hat{\bar{R}}, \hat{\bar{G}}, \hat{\bar{B}}) = (R_{low}, G_{low}, B_{low}).$$

If the error values for $R_{low}, G_{low}, B_{low}$ and $R_{high}, G_{high}, B_{high}$ are "normalized" to 0 (basically corresponds to subtracting $$\frac{2}{3}\xi$$

from the error value $\epsilon^2$ for all different variants of R, G and B in Table 2) the following table of normalized error values is obtained. Note that the normalized error values for the color codewords other than $R_{low}, G_{low}, B_{low}$ and $R_{high}, G_{high}, B_{high}$ of Table 3 correspond to the expressions in the straight brackets of Table 2.

TABLE 3

| Color codeword | Normalized error value $\epsilon^2$ |
| --- | --- |
| $R_{low}, G_{low}, B_{low}$ | 0 |
| $R_{high}, G_{low}, B_{low}$ | $w_R^2[17(w_G^2 + w_B^2) - 2w_G^2(\delta_G - \delta_R) - 2w_B^2(\delta_B - \delta_R)]$ |
| $R_{low}, G_{high}, B_{low}$ | $w_G^2[17(w_R^2 + w_B^2) - 2w_R^2(\delta_R - \delta_G) - 2w_B^2(\delta_B - \delta_G)]$ |
| $R_{low}, G_{low}, B_{high}$ | $w_B^2[17(w_R^2 + w_G^2) - 2w_R^2(\delta_R - \delta_B) - 2w_G^2(\delta_G - \delta_B)]$ |
| $R_{low}, G_{high}, B_{high}$ | $w_R^2[17(w_G^2 + w_B^2) + 2w_G^2(\delta_G - \delta_R) + 2w_B^2(\delta_B - \delta_R)]$ |
| $R_{high}, G_{low}, B_{high}$ | $w_G^2[17(w_R^2 + w_B^2) + 2w_R^2(\delta_R - \delta_G) + 2w_B^2(\delta_B - \delta_G)]$ |
| $R_{high}, G_{high}, B_{low}$ | $w_B^2[17(w_R^2 + w_G^2) + 2w_R^2(\delta_R - \delta_B) + 2w_G^2(\delta_G - \delta_B)]$ |
| $R_{high}, G_{high}, B_{high}$ | 0 |

Which of the neighboring quantized colors ($R_XG_YB_Z$, where X, Y, Z independently represent low or high) to use as color codeword can then be determined by comparing the "normalized" error values or representations and selecting as color codeword the neighboring quantized color that results in a smallest error value.

Another way to choose color codeword among the neighboring quantized colors is to compress the image block with each such quantized color and select the one associated with a smallest error. However, such an approach is somewhat slower than by simply using the error representations of Table 2 or 3 for determining a suitable color codeword since the block then has to be compressed eight times compared to one time.

Figure 7:
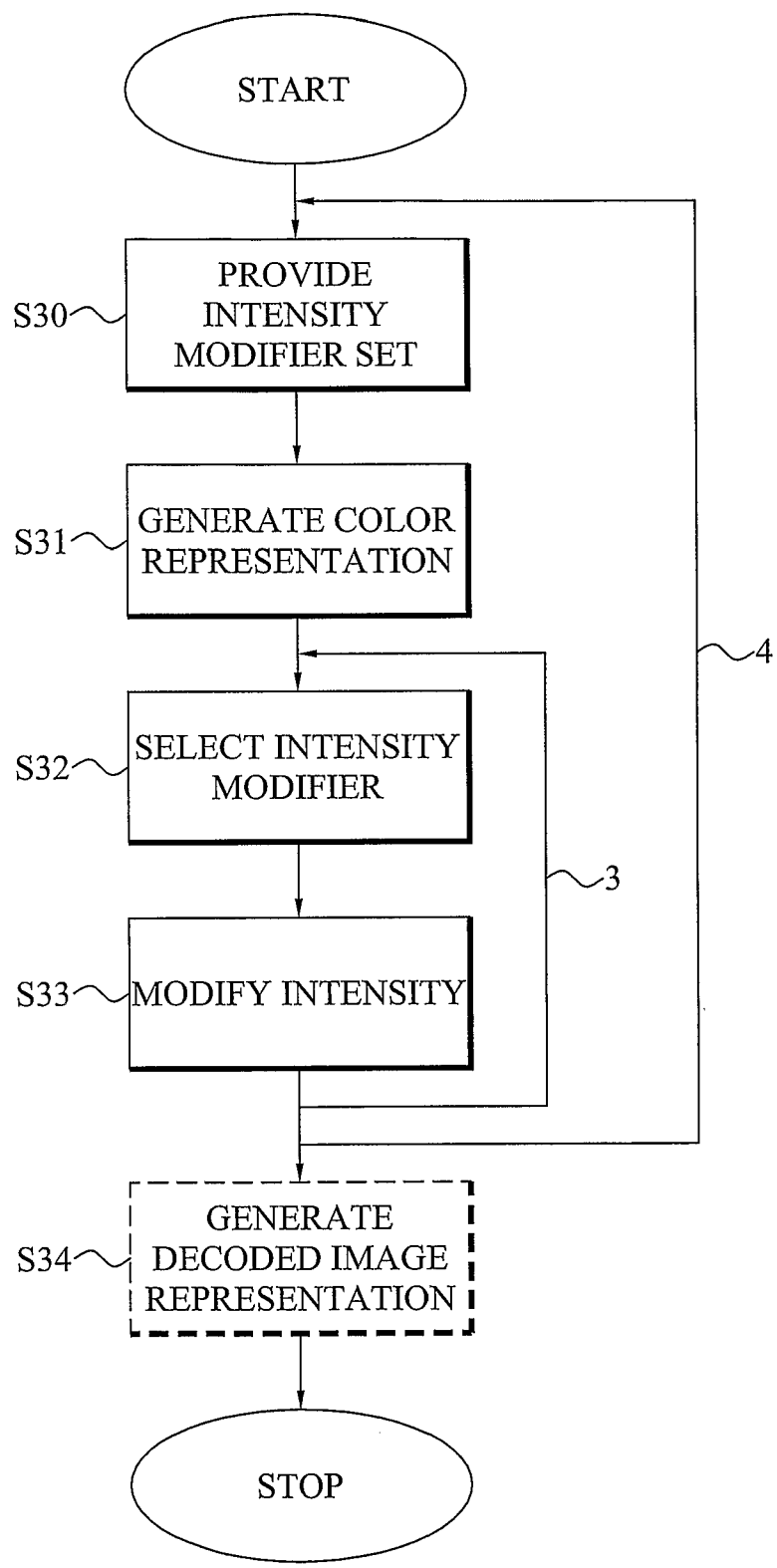
FIG. 7 is a flow diagram illustrating an image decoding method according to an example embodiment.

FIG. 7 illustrates a flow diagram of a method of decoding an encoded image or encoded version of an original image according to an example embodiment. The encoded image basically comprises several encoded representations of image blocks, such as representations 700 of FIG. 4. These encoded block representations are preferably generated by the image encoding method discussed above in connection with FIG. 1.

The method generally starts by identifying encoded image block(s) to decode. It could be possible that all encoded image blocks of an encoded image should be decoded to generate a decoded representation of the original image. Alternatively, only a portion of the original image is to be accessed. As a consequence, only a selected number of image blocks have to be decoded (or more precisely, a selected amount of image elements of certain image blocks have to be decoded).

Once the correct encoded (representation(s) of) image block(s) is identified, step S30 provides an intensity modifier set. This modifier set is provided based on the intensity codeword in the encoded representation. This set provision is preferably performed by identifying, by means of the intensity codeword, an intensity modifier set from a table, e.g. Table 1 above, comprising multiple modifier sets. However, in some applications it might be possible that the intensity codeword itself comprises the modifier set and that no table look-up is required.

In a next step S31, a color representation is generated for at least one of the image elements of the image block (i.e. for the image element(s) that should be decoded). This color generation is performed based on the color codeword in the encoded block representation. In step S32, the intensity modifier to use for the image element that should be decoded is selected. The modifier value is selected from the modifier set provided in step S30 based on the intensity representation associated with the image element and found in the representation sequence of the encoded block representation. Once the correct intensity modifier value is selected in step S32, the intensity of the image element is modified or modulated with this value in step S33. Intensity modification according to the technology disclosed herein refers to modifying, e.g. adding or multiplying, all color components of the color representation by the (possibly weighted) intensity modifier value.

Steps S32 and S33 could be performed for several image elements in the image block (schematically illustrated by line 3). It is anticipated that in some applications, only a single image element is decoded from a specific image block, multiple image elements of a specific image block are decoded and/or all the image elements of a specific block are decoded.

Steps S30 to S33 are then preferably repeated for all image blocks that comprise image elements that should be decoded (schematically illustrated by line 4). This means that the loop of steps S30 to S33 could be performed once, but most often several times for different encoded image blocks and/or several times for a specific encoded image block.

In the optional step S34, a decoded representation of the original image, or a portion thereof, is generated based on the decoded image elements and blocks. Note that in some applications, several image elements have to be decoded in order to render a single pixel of the decoded representation. For example, during trilinear interpolation, eight neighboring image elements are decoded and for bilinear interpolation the corresponding number is four image elements, which is well known to the person skilled in the art. The method then ends.

FIG. 8 illustrates an embodiment of steps S30 and S31 of FIG. 7 in more detail. In step S40, a correct intensity modifier set is identified and selected from the intensity table by means of the intensity codeword. If the intensity modifier set stored in the intensity table comprises a first sub-set of modifier values, e.g. [a, b], a second sub-set of intensity modifier values can be determined from the values of the first sub-set, e.g. [−a, −b]. In a next step S41, the quantized color of the color codeword, preferably 12 bits, is expanded or extended into, preferably, 24 bits. For the case with a RGB color, each quantized 4-bit color component of the color codeword is then expanded into an 8-bit color component. This color expansion may be realized by multiplying the quantized 4-bit color components by 17 for an implementation with 256 different colors $$\left(\frac{256-1}{16-1} = 17\right).$$

This is the same thing as replicating the 4-bit pattern to the first (top) and last (lower) 4 bits of the expanded 8-bit color word. In other words, a 4-bit color component of $1010_{bin}$ is expanded into $1010\ 1010_{bin}$. If the color codeword instead comprises 15 bits (5 bits for each R, G, B component), the expansion would result in a 30-bit color. This can be realized by multiplying the (5-bit) color component by $$33\left(\frac{1024-1}{32-1} = 33\right),$$

or replicating the 5-bit pattern to the top and lower 5 bits of the expanded 10-bit color word. In step S42, the expanded color is then assigned to the image elements of the image block, which are to be decoded. The method then continues to step S32 of FIG. 7.

FIG. 9 illustrates an embodiment of step S33 in FIG. 7 in more detail. In step S50, the identified and selected intensity modifier value is added to the expanded color. Thus, this modifier value is added to all components (all three for a RGB color) of the color for the image element. This could be implemented as a simple addition of the modifier value to all color components. However, in some applications it could be preferred to weight the modifier value before adding it to the components. In such a case, different weights can be employed for the different color components. In an alternative embodiment, another type of modification than a simple addition could be employed, e.g. multiplication, XOR or another modification. In such a case, the same modulation is performed to all components of the expanded color using one and the same intensity modifier value, although this value may be different weighted for the components. In a next step S51, the resulting intensity-modified color component values are clamped between a minimum color threshold and a maximum color threshold. For example, if after adding the (possibly weighted) intensity modifier value to a color component, the resulting value is smaller than the minimum threshold, the value is clamped to the value of this threshold.

Correspondingly, if the resulting value is larger than the maximum threshold, the value of the threshold should instead be used for that component. A non-limiting example of a minimum and maximum threshold is 0 and 255, respectively, for the case with 256 different colors. Corresponding thresholds for 1024 colors could be 0 and 1023. The method then continues to step S34 of FIG. 7.

Decoding an encoded image block will further be illustrated by an example herebelow. In this example, an encoded block representation as illustrated in FIG. 4 and an image block as illustrated in FIG. 2 are assumed.

The encoded representation of the image block is according to 1010 0101 0001 0111 11 01 10 00 10 01 00 00$_{bin}$ (a517D890$_{hex}$), where the bit 0-3 is the red component of the color codeword, bit 4-7 is the green component of the color codeword, bit 8-11 is the blue component of the color codeword, bit 12-15 is the intensity codeword and bit 16-31 is the sequence of intensity representations for the image elements of the block.

The color codeword is then decoded (expanded) to generate the color representation of the image block. Each color component in the color codeword is in 4 bits, but is expanded to 8 bits by multiplying by 17 (17=11$_{hex}$), which is the same thing as replicating the 4-bit pattern to both the top and lower 4 bits of the 8-bit word:

Red: $a_{hex} \times 11_{hex} = aa_{hex} \Leftrightarrow 1010\ 1010_{bin} \Leftrightarrow 170$ Green: $5_{hex} \times 11_{hex} = 55_{hex} \Leftrightarrow 0101\ 0101_{bin} \Leftrightarrow 85$ Blue: $1_{hex} \times 11_{hex} = 11_{hex} \Leftrightarrow 0001\ 0001_{bin} \Leftrightarrow 17$ This expanded color is then assigned to the image elements of the image blocks giving:

| | | | |
|---|---|---|---|
| (170, 85, 17) | (170, 85, 17) | (170, 85, 17) | (170, 85, 17) |
| (170, 85, 17) | (170, 85, 17) | (170, 85, 17) | (170, 85, 17) |

The correct intensity modifier set to use is selected from Table 1 based on the intensity codeword. As is seen in Table 1 an intensity codeword of 0111$_{bin}$ corresponds to intensity modifiers [−127, −42, 42, 127].

The sequence of intensity representations enables identification of which of these four modifier values to use for the different image element according to:

$$\begin{bmatrix} 11_{bin} \\ 10_{bin} \\ 00_{bin} \\ 01_{bin} \end{bmatrix} = \begin{bmatrix} -127 \\ -42 \\ 42 \\ 127 \end{bmatrix}$$

The first intensity representation is 11$_{bin}$, which means that the first intensity modifier value, −127, should be added to all three components of the first image element:

$$\begin{bmatrix} 170 \\ 85 \\ 17 \end{bmatrix} + \begin{bmatrix} -127 \\ -127 \\ -127 \end{bmatrix} = \begin{bmatrix} 43 \\ -42 \\ -110 \end{bmatrix}$$

The resulting components are then clamped between 0 and 255, thus giving (43, 0, 0). The partly decoded image block is now according to:

| | | | |
|---|---|---|---|
| (43, 0, 0) | (170, 85, 17) | (170, 85, 17) | (170, 85, 17) |
| (170, 85, 17) | (170, 85, 17) | (170, 85, 17) | (170, 85, 17) |

For the next image element, the intensity representation is 01$_{bin}$, i.e. the intensity modifier 127 should be added to all three color components. The result after clamping is (255, 212, 144). Repeating this procedure for all image elements in the block would create the final decoded image block shown below:

| | | | |
|---|---|---|---|
| (43, 0, 0) | (255, 212, 144) | (128, 43, 0) | (212, 127, 59) |
| (128, 43, 0) | (255, 212, 144) | (212, 127, 59) | (212, 127, 59) |

The image encoding (image block encoding) and image decoding (image block decoding or processing) scheme in an example embodiment could be provided in a general data processing system, e.g. in a user terminal or other unit configured for processing and/or rendering images. Such a terminal could be a computer. However, the technology disclosed herein is well adapted for thin clients, such as Personal Digital Assistance (PDA), mobile units and telephones. Such terminals are typically characterized by limited memory capacity and memory bandwidth, and are powered by batteries, i.e. also limited power supply. Since both encoding and decoding according to the present invention can be implemented very simply in hardware, software or a combination of hardware and software and an encoded image block preferably only has a maximum size of 32 bits, the technology disclosed herein could with advantage be applied to a thin client.

FIG. 10 illustrates a user terminal 100 represented by a mobile unit. However, the technology disclosed herein is not limited to mobile units by could be implemented in other terminals and data processing units. Only means and elements in the mobile unit 100 directly involved in the technology disclosed herein are illustrated in the figure.

The mobile unit 100 comprises a (central) processing unit (CPU) 200 for processing data, including image data, within the mobile unit 100. A graphic system 130 is provided in the mobile unit 100 for managing image and graphic data. In particular, the graphic system 130 is adapted for rendering or displaying images on a connected screen 120 or other display unit. The mobile unit 100 also comprises a storage or memory 140 for storing data therein. In this memory 140 image data may be stored, in particular encoded image data (encoded image blocks) according to an example embodiment. Due to the small total size of image blocks (32 bits) and high compression rate (4 bpp), image data can efficiently be stored in the memory 140 also in cases with a mobile unit 100 with limited memory capacity.

An image encoder 210 according to an example embodiment is provided in the mobile unit 100. This encoder 210 is configured for encoding an image or texture into an encoded representation of the image (or texture). As was discussed above, such an encoded representation comprises a sequence or file of multiple decoded image blocks. This image encoder 210 may be provided as software running on the CPU 200, as is illustrated in the figure. Alternatively, or in addition, the encoder 210 could be arranged in the graphic system 130 or elsewhere in the mobile unit 100.

An encoded representation of an image from the block encoder 210 may be provided to the memory 140 over a (memory) bus 150, for storage therein until a subsequent rendering of the image. Alternatively, or in addition, the encoded image data may be forwarded to an input and output (I/O) unit 110 for (wireless or wired) transmission to other external terminals or units. This I/O unit 110 can also be adapted for receiving image data from an external unit. This image data could be an image that should be encoded by the image encoder 210 or encoded image data that should be decoded. It could also be possible to store the encoded image representation in a dedicated texture memory provided, for example, in the graphic system 130. Furthermore, portions of the encoded image could also, or alternatively, be (temporarily) stored in a texture cache memory, e.g. in the graphic system 130.

If the (memory) bus 150 has a maximal bandwidth of 32 bits, a single memory access is required to fetch or read out an encoded image representation from the memory 140. If however, the bus 150 has larger bandwidth capacity, e.g. 64 bits or even 128 bits, multiple encoded image representations could be fetched in a single memory access. For example assume a 64-bit bus 150 and image block size according to FIG. 2. If the image blocks are piled "on top of each other", an image block together with the subsequent image block in the memory 140 will form a 4×4 square of image elements. However, if the blocks are positioned "side by side", the image block together with the following block will form a 2×8 box. A 4×4 square is more preferred, since the probability of finding a desired image element in the 4×4 square is larger than for the 2×8 box, if some form of texture caching system is employed, which is well known to the person skilled in the art.

An image decoder 220 according to an example embodiment is provided in the mobile unit 100 for decoding an encoded image in order to generate a decoded image representation. This decoded representation could correspond to the whole original image or a portion thereof. The image decoder 220 provides decoded image data to the graphic system 130, which in turn typically processes the data before it is rendered or presented on the screen 120. The image decoder 220 can be arranged in the graphic system 130, as is illustrated in the figure. Alternatively, or in addition, the decoder 200 can be provided as software running on the CPU 200 or elsewhere in the mobile unit 100.

The mobile unit 100 could be equipped with both an image encoder 210 and an image decoder 220, as is illustrated in the figure. However, for some terminals 100 it could be possible to only include an image encoder 210. In such a case, encoded image data could be transmitted to another terminal that performs the decoding and, possibly, rendering of the image. Correspondingly, a terminal 100 could only include an image decoder 220, i.e. no encoder. Such a terminal 100 then receives a signal comprising encoded image data from another terminal and decodes it to generate a decoded image representation. Thus, the encoded image signal could be wirelessly be transmitted between terminals using radio transmitter and receiver. Alternatively, other techniques for distributing images and encoded image representations between terminals could be employed, such as IR-techniques using IR ports and wired transferring of image data between terminals. Also memory, cards or chips that can be connected and exchanged between terminals could be used for this image data inter-terminal distribution.

The units 110, 130, 200, 210 and 220 of the mobile unit 100 may be provided as software, hardware or a combination thereof.

FIG. 11 illustrates a block diagram of an example embodiment of an image encoder 210. The encoder 210 typically comprises an image decomposer 215 for decomposing or dividing an input image into several image blocks. The decomposer 215 is preferably configured for decomposing the image into image blocks comprising eight image elements (pixels or texels), i.e. having a general size of 8×1 or 8×1 image elements, more preferably 4×2 or 2×4 image elements. This decomposer 215 could be adapted for decomposing different input images into image blocks with different sizes. For example, for a first image type an image block size of 4×2 image elements is used, whereas for a second type a block size of 8×1 could be used. In such a case, the decomposer 215 preferably receives input information, enabling identification of which image block format to use for a given image.

This embodiment of the image encoder 210 comprises a single block encoder 300. This block encoder 300 encodes the image block(s) received from the image decomposer to generate encoded block representation(s). Such an image block representation comprises a color codeword, an intensity codeword and a sequence of intensity representations. The overall size of the block representation is much smaller than the corresponding size of the uncoded image block. The block encoder 300 is preferably configured for processing (encoding) each image block from the decomposer 215 sequentially.

The block encoder 300 preferably comprises, or has access to, an intensity table 500 comprising multiple intensity modifier sets. The modifier sets of the table 500 are used during the encoding for the generation of the intensity, and possibly color, codeword. The intensity table 500 could be arranged in the block encoder 300 or elsewhere in the image encoder 210.

The image encoder 210 could comprise a single intensity table 500. Alternatively, several different tables could be arranged in the encoder 210, where the intensity modifiers of the tables are adapted for different image types or a table could be adapted for a specific image. For example, a first intensity table could be used during encoding of a first image type, e.g. photo, whereas a second table is used for encoding an image of a second type, e.g. text. However, in order save memory, a single intensity table 500 generated with training data from several different image types is preferably employed in the encoder 210.

The units 215 and 300 of the image encoder 210 may be provided as software, hardware or a combination thereof. The units 215, 300 and 500 may be implemented together in the image encoder 210. Alternatively, a distributed implementation is also possible with some of the units provided elsewhere in the mobile unit.

FIG. 12 illustrates a block diagram of another example embodiment of the image encoder 210. This image encoder 210 comprises an image decomposer 215 as the embodiment of FIG. 11, which is not further discussed. However, the encoder 210 includes multiple (M, where M is a positive integer larger than one) block encoders 300-1 to 300-M. Each such block encoder 300-1 to 300-M basically corresponds to the block encoder of the image encoder in FIG. 11. By providing multiple block encoders 300-1 to 300-M in the image encoder 210, multiple image blocks from the decomposer 215 may be processed (encoded) in parallel, which reduces the total image encoding time.

Each block encoder 300-1 to 300-M could comprise an intensity table 500. The intensity tables 500 in the different encoders 300-1 to 300-M could all include identical intensity modifier values. Alternatively, different block encoders could include different tables. In such a case, one or several block encoders could be adapted for a certain image type, whereas other block encoders are adapted for other image type(s). In an alternative implementation, a single intensity table 500 is arranged in the image encoder 210 and connected to all block encoders 300-1 to 300-M.

The units 215 and 300-1 to 300-M of the image encoder 210 may be provided as software, hardware or a combination thereof. The units 215, 300-1 to 300-M and 500 may be implemented together in the image encoder 210. Alternatively, a distributed implementation is also possible with some of the units provided elsewhere in the mobile unit.

FIG. 13 illustrates a block diagram of an example embodiment of a block encoder 300, such as the block encoder of the image encoder in FIG. 11 or one of the block encoders in the image encoder of FIG. 12. The encoder 300 comprises a color quantizer 310 that determines a color representation of the colors of the image elements in the image block and quantizes this color representation. The color representation is preferably a 24-bit average color of the image element and is subsequently quantized to a 12-bit color representation, i.e. the color codeword, by the quantizer 310.

An intensity quantizer 320 is provided in the block encoder 300 for identifying an intensity modifier set to use for a current image block. The quantizer 320 is preferably configured for selecting this modifier set from an associated intensity table 500. The quantizer 320 then generates an intensity codeword that is associated with the selected modifier set. The encoder 300 further includes an intensity selector 330 that selects, for the image elements in the image block, an intensity modifier from the identified intensity modifier set. The color quantizer 310, intensity quantizer 320 and intensity selector 330 are preferably configured for combined quantization of the color and intensity codeword, as was discussed in detail in the foregoing.

The units 310, 320 and 330 of the block encoder 300 may be provided as software, hardware or a combination thereof. The units 310, 320, 330 and 500 may be implemented together in the block encoder 300. Alternatively, a distributed implementation is also possible with some of the units provided elsewhere in the image encoder.

FIG. 14 illustrates a block diagram of another example embodiment of a block encoder 300. This block encoder 300 comprises an error estimator 340 for estimating error values for the purpose of selecting intensity modifier set and values, and possibly quantized color value, to use for an image block. This estimator 340 is preferably configured for calculating an error value for a first selection of an intensity modifier set and values (and color in the case of exhaustive encoding) for the image elements in the image block. This first error value is then stored. The error calculation is then repeated for all possible selections of modifier set and values (and color), and after each calculation the estimated error value is compared to the stored error. If it is smaller than the stored value, it replaces the previously stored error. In addition, the selection of modifier set and values (and color) associated with the error value are also stored. Once all combinations have been tested, the selection resulting in the smallest error is used for generation of intensity (and color) codeword and intensity representations. An intensity modifier set selector 322 and intensity selector 330 then selects the modifier set and modifier values that are associated with the smallest error. The remaining units of the block encoder 300 have correspondences in FIG. 13 and are not further discussed. Alternatively, this embodiment of the block encoder 300 could operate according to the combined quantization as described above. In such a case, the color quantizer 310 provides the neighboring quantized colors of the calculated average color of the image block. The error estimator 340 determines error representations for each such neighboring quantized color, e.g. as illustrated in Table 2 or 3, and the neighboring quantized color that results in a smallest error representation is selected as the color codeword for the image block.

The units 310, 320, 322, 330 and 340 of the block encoder 300 may be provided as software, hardware or a combination thereof. The units 310, 320, 322, 330, 340 and 500 may be implemented together in the block encoder 300. Alternatively, a distributed implementation is also possible with some of the units provided elsewhere in the image encoder.

A preferred example implementation of a color quantizer 310 is illustrated in the block diagram of FIG. 15. The quantizer 310 comprises means 312 configured for determining an average of the colors of the image elements in the image block. This average color is preferably a RGB color, but could be any other color format used in image processing. This determined average color is then provided to quantizing means 314, which quantizes the average color. The quantizer 314 is preferably configured for quantizing a 24-bit average RGB color from the color averager 312 into a 12-bit RGB color.

The units 312 and 314 of the color quantizer 310 may be provided as software, hardware or a combination thereof. The units 310 and 314 may be implemented together in the color quantizer 310. Alternatively, a distributed implementation is also possible with some of the units provided elsewhere in the block encoder.

FIG. 16 illustrates a block diagram of an example embodiment of a block decoder 220. The block decoder 220 preferably comprises a block selector 222 that is adapted for selecting, e.g. from a memory, which encoded image block(s) that should be provided to a block decoder 400 for decoding. The block selector 222 preferably receives input information associated with the encoded image data, e.g. from a header or a rendering engine. An address of an encoded image block having the desired image element(s) is then computed based on the input information. This computed address is preferably dependent upon the image-element (pixel or texel) coordinates within an image. Using the address, the block selector 222 identifies the encoded image block from the memory. This identified encoded image block is then fetched from the storage and provided to the block decoder 400.

The (random) access to image elements of an image block advantageously enables selective decoding of only those portions of an image that are needed. Furthermore, the image can be decoded in any order the data is required. For example, in texture mapping only portions of the texture may be required and these portions will generally be required in a non-sequential order. Thus, the image decoding can with advantage by applied to process only a portion or section of an image.

The selected encoded image block is then forwarded to the block decoder 400. In addition to the image block, the decoder 400 preferably receives information specifying which image elements of the block that should be decoded. The information could specify that the whole image block, i.e. all image elements therein, should be decoded. However, the received information could identify only a single or a few of the image elements that should be decoded. The block decoder 400 then generates a decoded representation of the image element(s) in the block. This decoded representation is preferably a P-bit color, where P is the number of bits per image element in the original image, e.g. a 24-bit RGB color. The block decoder 400 preferably comprises an intensity table 500 that is used during the decoding procedure. Alternatively, this intensity table 500 could be provided elsewhere in the image decoder 220. Usage of different intensity tables for different image types, discussed above in connection to FIG. 11, also applies to the image decoder 220.

An optional image composer 224 could be provided in the decoder 220. This composer receives the decoded image elements from the block decoder 400 and composes them to generate a pixel that can be rendered or displayed on a screen. The composer 224 could require several input image elements to generate a single pixel. This image composer 224 could alternatively be provided in the graphic system.

The units 222, 224 and 400 of the block decoder 220 may be provided as software, hardware or a combination thereof. The units 222, 224, 400 and 500 may be implemented together in the block decoder 220. Alternatively, a distributed implementation is also possible with some of the units provided elsewhere in the mobile unit.

FIG. 17 illustrates a block diagram of another example embodiment of an image decoder 220. The block selector 222 and image composer 224 are similar to corresponding units in FIG. 16 and are not further discussed.

The image decoder 220 comprises multiple block decoders 400-1 to 400-Q (Q is a positive integer larger than one). By having access to multiple block decoders 400-1 to 400-Q, the image decoder 220 can process (decode) multiple encoded image blocks in parallel. These multiple block decoders 400-1 to 400-Q allow for parallel processing that increases the processing performance and efficiency of the image decoder 220. For example, one decoded image element is generally sufficient for nearest neighbor interpolation, whereas four (eight) image element are need for bilinear (trilinear) interpolation. Each block decoder 400-1 to 400-Q could comprise an intensity table 500 used for the decoding. Alternatively, a single table 500 is arranged in the image decoder 220 and connected to all block decoders 400-1 to 400-Q. The further discussion of using different types of intensity tables, see above in connection with FIG. 12, also applies for the image decoder 220.

The units 222, 224 and 400-1 to 400-Q of the image decoder 220 may be provided as software, hardware or a combination thereof. The units 222, 224, 400-1 to 400-Q and 500 may be implemented together in the image decoder 220. Alternatively, a distributed implementation is also possible with some of the units provided elsewhere in the mobile unit.

FIG. 18 is an illustration of an example embodiment of a block decoder 400. The block decoder 400 comprises means 410 for providing an intensity modifier set from an associated intensity table 500 based on the intensity codeword. This provider 410 could be configured for fetching a first sub-set of modifier values from the intensity table 500 and determining a second sub-set of modifiers based on the first sub-set. A color generator 420 generates a single color representation for all image elements in the image block based on the color codeword. This generator 420 preferably expands the 12-bit color of the codeword into a 24-bit (RGB) color.

An intensity modifier selector 430 is arranged for selecting one of the intensity modifier values from the modifier set provided by the means 410. The modifier selector 430 is configured for selecting correct modifier values for the image elements in the encoded image block based on the sequence of intensity representations. The expanded color from the color generator 420 and modifier value from modifier selector 430 are forwarded to an intensity modulator or modifier 440 that modifies the intensity of the color components of the expanded color with the modifier value. The modifier 440 could use a weighted intensity modifier value, with different weights for the different color components. Furthermore, once the color components have been intensity modified the modifier 440 preferably clamps the components between a maximum and minimum threshold, e.g. between 0 and 255.

The units 410, 420, 430 and 440 of the block decoder 400 may be provided as software, hardware or a combination thereof. The units 410, 420, 430, 440 and 500 may be implemented together in the block decoder 400. Alternatively, a distributed implementation is also possible with some of the units provided elsewhere in the image decoder.

FIG. 19 schematically illustrates a possible example hardware implementation of a block decoder 400 according to an example embodiment. The input to the block decoder 400 is an encoded block representation 700 comprising a 12-bit color codeword 710 (4 bits for each of the red, green and blue component), a 4-bit intensity codeword 720 and a 16-bit sequence of intensity 730.

The color codeword is provided to the color generator 420, which is realized by three bit extenders 422 to 426. A first bit extender 422 receives the 4-bit red component, a second 424 and third 426 extender receives the 4-bit green and blue component, respectively. The output from respective extender 422 to 426 is an 8-bit color component. This 8-bit component is simply obtained by multiplying the input component with 17, or multiplying the component with 16 and then adding the component. Alternatively, the extenders 422 to 426 could be implemented as bit shifters and OR-gates, e.g. $(1011_{bin} <<4)$ OR $1011_{bin} = 1011\ 0000_{bin}$ OR $1011_{bin} = 1011\ 1011_{bin}$, where $<<4$ corresponds to shifting a word four bits to the left.

A modifier selector 430 is implemented as a multiplexor 435. A 3-bit address index is input to this multiplexor 435. Based on the address index, the multiplexor 435 selects which of the eight image elements to decode. The 2-bit intensity representation associated with the selected image element is then forwarded to a table look-up 415. This table look-up corresponds to the modifier set provider 410 and intensity table 500 of FIG. 18. Using the input intensity codeword and intensity representation the look-up 415 fetches the correct intensity modifier value from one of the modifier sets in the table. This 9-bit signed (positive or negative) modifier value is then provided to an intensity modifier 440. In this hardware implementation the modifier 440 comprises three adders 441 to 443 and three dampers 444 to 446. The modifier value is input to respective adder 441 to 443. A first adder 441 adds the intensity modifier value to the 8-bit red component from bit extender 422. Correspondingly, adder 442 and adder 443 adds the modifier value to the 8-bit green and blue component from bit extender 424 and 426, respectively. In an alternative implementation, the adders 441 to 443 can be replaced with other modifying elements, e.g. multipliers or XOR gates. The outputs from the adders 441 to 443 are forwarded to dampers 444 to 446, which clamp the intensity modified color components between 0 and 255. The output from the dampers 444 to 446 is the decompressed or decoded 24-bit color of the image element.

FIG. 20 schematically illustrates a possible hardware implementation of the bit extenders 422; 424; 426 of FIG. 19. These extenders receive a 4-bit (red, green or blue) color component and output an extended corresponding 8-bit color component. In the output 8-bit color component, the four most significant bits (MSBs) constitute the input 4-bit color component, the "fifth MSB" corresponds to the MSB of the input component, the "sixth MSB" corresponds to the "second MSB" of the input component and the remaining two least significant bits (LSBs) correspond to the two LSBs of the input component.

FIG. 21 schematically illustrates a possible hardware implementation of the table look-up 415 of FIG. 19. The three LSBs of the 4-bit input intensity codewords are input to two multiplexors 411 and 412 for selecting one 7-bit intensity modifier value from eight possible modifier values for each multiplexor 411 and 412. From these 16 intensity modifiers the remaining 48 values could be calculated if employing an intensity table according to Table 1. The selected intensity modifier values from the multiplexors 411 and 412 are input to another multiplexor 413 that selects one of these values based on 1-bit input data (1 bit of the 2-bit intensity representation) from the multiplexor 435 in FIG. 19. The selected modifier value is then forwarded both to a multiplexor 416 and to negation means 414 that negates the modifier value. Also this negated value is forwarded to the multiplexor 416. This multiplexor 416 selects either the positive 7-bit intensity modifier value or the negated value based on the remaining bit of the intensity representation from the multiplexor 435 in FIG. 19. The selected (8-bit) modifier value is then brought both to a multiplexor 418 and to a bit-shifter 417 that shifts the modifier value one bit to the left, resulting in a 9-bit intensity modifier (corresponds to a multiplication of the value, in base ten, by two). The multiplexor 418 then selects either the 8-bit modifier value or the 9-bit modifier value based on the MSB from the intensity codeword. The result from the selection is the 9-bit intensity modifier value, out of the 64 possible modifier values, to use for a specific image element.

FIG. 22 schematically illustrates a possible hardware implementation of the dampers 444; 445; 446 of FIG. 19. The input to the damper 444; 445; 446 is a 10-bit intensity-modified color component value. The eight LSBs of this input value are brought a multiplexor 447. The other input to the multiplexor is the maximum threshold value (255; 8 bits). The multiplexor 447 selects either the 8-bit input value or the maximum threshold value based on the second MSB of the intensity modified color component. In other words, if this second MSB is equal to one, the multiplexor 447 outputs the threshold value, otherwise (the second MSB is equal to zero) the 8-bit input value is output to a second multiplexor 448. This second multiplexor 448 compares the output from the first multiplexor 447 with the minimum threshold value (0; 8 bits) based on the MSB of the color component. If this MSB or sign bit is equal to one, the output from the first multiplexor 447 is negative and the minimum threshold value should be selected by the second multiplexor 448. However, if the sign bit is zero the output from the first multiplexor 447 should also be output from the second multiplexor 448.

The hardware solution for the block encoder 400 in FIG. 19 is very simple, it basically comprises only three additions, one negation and 12 multiplexors if the bit extenders 422; 424; 426, table lock-up 415 and dampers 444; 445; 446 are implemented according to FIG. 20, FIG. 21 and FIG. 22, respectively. This should be compared to decompression using the S3TC scheme [3], which requires up to 42 additions and two multiplexors.

It will be understood by a person skilled in the art that various modifications and changes may be made to the present invention without departure from the scope thereof, which is defined by the appended claims.

REFERENCES

[1] E. J. Delp and O. R. Mitchell, "Image compression using block truncation coding", *IEEE Transactions on Communications*, Vol. COM-2, No. 9, pp. 1335-1342, September 1979

[2] G. Campbell, T. A. DeFanti, J. Frederiksen, S. A. Joyce, L. A. Leske, J. A. Lindberg and D. J. Sandin, "Two bit/pixel full color encoding", *SIGGRAPH '86 Conference Proceedings*, Vol. 20, No. 4, pp. 215-223, August 1986

[3] U.S. Pat. No. 5,956,431

[4] T. Akenine-Möller and J. Ström, "Graphics for the masses: A hardware architecture for mobile phones", *ACM Transactions on Graphics*, Vol. 22, No. 3, *Proceedings of ACM SIGGRAPH* 2003, pp. 801-808, July, 2003

[5] S. Fenney, "Texture compression using low-frequency signal modulation", *Graphics Hardware* 2003, pp. 84-91, July 2003

[6] Y. Linde, A. Buzo and R. Gray, "An algorithm for vector quantizer design", *IEEE Transactions on Communications, Vol. 28*, pp. 84-94, January 1980

The invention claimed is:

1. A method of compressing an image block comprising multiple image elements, said method comprising:
    a computer-implemented color quantizer determining a color codeword that is a representation of the colors of said image elements in said image block;
    a computer-implemented intensity quantizer providing an intensity codeword that is a representation of a set of multiple intensity modifiers for modifying the intensity of said image elements in said image block; and
    a computer-implemented intensity representation selector selecting, for each image element in said image block, an intensity representation associated with an intensity modifier from said intensity modifier set.

2. The method according to claim 1, wherein determining said color codeword comprises:
    determining an average color of said image elements in said image block; and
    quantizing said average color.

3. The method according to claim 2, wherein quantizing said average color comprises:
    determining, for each neighboring quantized color of said average color, an error representation; and
    selecting the neighboring quantized color associated with a smallest error representation as said quantized average color.

4. The method according to claim 3, wherein said error representation is a weighted error representation.

5. The method according to claim 3, wherein determining said error representation comprises:
    compressing, for each neighboring quantized color, said image block; and
    determining, for each neighboring quantized color, said error representation based on a comparison of said image block and said compressed representation of said image block.

6. The method according to claim 1, wherein said intensity modifier set comprises mathematically complementary intensity modifier values.

7. The method according to claim 1, wherein said computer-implemented intensity quantizer providing an intensity codeword comprises selecting said intensity modifier set from an intensity table comprising multiple intensity modifier sets, whereby said intensity codeword enables identification of said selected intensity modifier set from said table.

8. The method according to claim 7, wherein said steps of said computer-implemented selector selecting and said computer-implemented intensity representation selector selecting comprise:
    determining, for each image element in said image block, a difference between an original color value and an average color intensity-modified with an intensity modifier from an intensity modifier set of said intensity table;
    estimating an error value based on said determined differences; and
    selecting an intensity modifier set and selecting intensity modifiers that minimize said error value.

9. The method according to claim 8, wherein said error value is a weighted error value, a weight for a given color component being equal for said original and said average color.

10. The method according to claim 7, wherein determining said color codeword, selecting said intensity modifier set, and selecting said intensity representation comprise:
  determining, for each image element in said image block, a difference between an original color value and a quantized color intensity-modified with an intensity modifier from an intensity modifier set of said intensity table;
  estimating an error value based on said determined differences; and
  selecting a quantized color, selecting an intensity modifier set, and selecting intensity modifiers that minimize said error value, whereby said color codeword comprises said selected quantized color.

11. The method according to claim 10, wherein said error value is a weighted error value, a weight for a given color component being equal for said original and said quantized color.

12. The method according to claim 1, wherein said image block comprises $2^m \times 2^n$ image elements, where m=3−n and n=0, 1, 2, 3.

13. The method according to claim 1, wherein a compressed representation of said image block is a 32-bit sequence, where said color codeword comprises 12 bits, said intensity codeword comprises 4 bits and a sequence of said intensity representations comprises 16 bits.

14. A method of processing a compressed representation of an image block comprising multiple image elements, said compressed representation comprising a color codeword, an intensity codeword, and an intensity representation sequence, and said method comprising:
  providing a set of multiple intensity modifiers based on said intensity codeword;
  for at least one image element in said image block;
  a computer-implemented color generator generating a color representation based on said color codeword;
  a computer-implemented selector selecting an intensity modifier from said intensity modifier set based on said intensity representation sequence; and
  a computer implemented intensity modifier modifying the intensity of said at least one image element based on said selected intensity modifier.

15. The method according to claim 14, wherein said intensity modifier set comprises mathematically complementary intensity modifier values.

16. The method according to claim 14, wherein providing said intensity modifier set comprises selecting, based on said intensity codeword, said intensity modifier set from an intensity table comprising multiple intensity modifier sets.

17. The method according to claim 16, wherein said table comprises a first sub-set of intensity modifier sets, said method further comprising determining intensity modifiers of intensity modifier sets for a second sub-set based on intensity modifiers of intensity modifier sets in said first sub-set.

18. The method according to claim 14, wherein said intensity representation sequence is a sequence comprising, for each image element in said representation of said image block, an intensity index enabling identification of which of said multiple intensity modifiers of said intensity modifier set to use for said image element.

19. The method according to claim 14, wherein modifying the intensity comprises adding a selected intensity modifier value to all color component values of said color representation.

20. The method according to claim 14, wherein modifying the intensity comprises adding a selected intensity modifier value multiplied by component-specific weights to all color component values of said color representation.

21. The method according to claim 19, further comprising clamping the sums of said intensity modifier value and said color component values between a minimum threshold value and a maximum threshold value.

22. The method according to claim 14, wherein said image block comprises $2^m \times 2^n$ image elements, where m=3−n and n=0, 1, 2, 3.

23. The method according to claim 14, wherein said representation of said image block is a 32-bit sequence, where said color codeword comprises 12 bits, said intensity codeword comprises 4 bits and said intensity representation sequence comprises 16 bits.

24. A computer program product stored on a computer-readable medium and defining a block encoder for compressing an image block comprising multiple image elements, said computer program product comprising coded instructions which, when executed by a computer, perform the functions of:
  a color quantizer configured to determine a color codeword that is a representation of the colors of said image elements in said image block;
  an intensity quantizer configured to provide an intensity codeword that is a representation of a set of multiple intensity modifiers for modifying the intensity of said image elements in said image block; and
  a intensity representation selector configured to select, for each image element in said image block, an intensity representation associated with an intensity modifier from said intensity modifier set.

25. The computer program product according to claim 24, wherein said color quantizer comprises:
  means for determining an average color of said image elements in said image block; and
  quantizing means for quantizing said average color.

26. The computer program product according to claim 25, wherein said quantizing means is configured for providing neighboring quantized colors of said average color, said computer program elements further comprising an error estimator for determining, for each neighboring quantized color of said average color, an error representation and for selecting the neighboring quantized color associated with a smallest error representation as said quantized average color.

27. The computer program product according to claim 26, wherein said error representation is a weighted error representation.

28. The computer program product according to claim 26, wherein said software-implemented block encoder is configured for compressing, for each neighboring quantized color, said image block and said error estimator is configured for determining, for each neighboring quantized color, said error representation based on a comparison of said image block and said compressed representation of said image block.

29. The computer program product according to claim 24, wherein said intensity modifier set comprises mathematically complementary intensity modifier values.

30. The computer program product according to claim 24, wherein the coded instructions, when executed by a computer, perform the further functions of an intensity table comprising multiple intensity modifier sets, and said intensity quantizer comprises a selector for selecting said intensity modifier set from said intensity table, whereby said intensity codeword enables identification of said selected intensity modifier set from said table.

31. The computer program product according to claim 30, wherein the coded instructions, when executed by a computer, perform the further functions of:

means for determining, for each image element in said image block, a difference between an original color value and an average color intensity-modified with an intensity modifier from an intensity modifier set of said intensity table; and an error estimator for estimating an error value based on said determined differences, and said modifier set selector and said representation selector are configured for selecting an intensity modifier set and intensity modifiers that minimize said error value.

32. The computer program product according to claim 31, wherein said error estimator is adapted for estimating a weighted error value, a weight for a given color component being equal for said original and said average color.

33. The computer program product according to claim 24, wherein the coded instructions, when executed by a computer, perform the further functions of:

means for determining, for each image element in said image block, a difference between an original color value and a quantized color intensity-modified with an intensity modifier from an intensity modifier set of said intensity table; and an error estimator for estimating an error value based on said determined differences, and said color quantizer, said modifier set selector and said representation selector are configured for selecting a quantized color, an intensity modifier set and intensity modifiers that minimize said error value, whereby said color codeword comprises said selected quantized color.

34. The computer program product according to claim 33, wherein said error estimator is adapted for estimating a weighted error value, a weight for a given color component being equal for said original and said quantized color.

35. The computer program product according to claim 24, wherein said image block comprises $2^m \times 2^n$ image elements, where m=3−n and n=0, 1, 2, 3.

36. The computer program product according to claim 24, wherein a compressed representation of said image block is a 32-bit sequence, where said color codeword comprises 12 bits, said intensity codeword comprises 4 bits and a sequence of said intensity representations comprises 16 bits.

37. A block encoder for compressing an image block comprising multiple image elements, said block encoder comprising:

a computer-implemented color quantizer configured to determine a color codeword that is a representation of the colors of said image elements in said image block;

a computer-implemented intensity quantizer configured to provide an intensity codeword that is a representation of a set of multiple intensity modifiers for modifying the intensity of said image elements in said image block; and a computer-implemented intensity representation selector configured to select, for each image element in said image block, an intensity representation associated with an intensity modifier from said intensity modifier set.

38. A computer program product stored on a computer-readable medium and defining a block decoder for processing a compressed representation of an image block comprising multiple image elements, said compressed representation comprising a color codeword, an intensity codeword and an intensity representation sequence, said computer program product comprising instructions which, when executed by a computer, perform acts comprising:

providing a set of multiple intensity modifiers based on said intensity codeword;

generating a color representation for at least one image element in said image block based on said color codeword;

selecting, for said at least one image element, an intensity modifier from said identified intensity modifier set based on said intensity representation sequence; and modifying the intensity of said at least one image element based on said selected intensity modifier.

39. A block decoder for processing a compressed representation of an image block comprising multiple image elements, said compressed representation comprising a color codeword, an intensity codeword, and an intensity representation sequence, and said block decoder comprising:

a computer-implemented means for providing a set of multiple intensity modifiers based on said intensity codeword;

a computer-implemented color generator configured to generate a color representation for at least one image element in said image block based on said color codeword;

a computer-implemented selector configured to select, for said at least one image element, an intensity modifier from said identified intensity modifier set based on said intensity representation sequence; and a computer-implemented intensity modifier configured to modify the intensity of said at least one image element based on said selected intensity modifier.

40. A mobile user terminal comprising:

a memory for storing a compressed representation of an image block comprising a color codeword, an intensity codeword and an intensity representation sequence; and a computer-implemented block decoder for processing said compressed representation of said image block, said block decoder comprising:

means for providing a set of multiple intensity modifiers based on said intensity codeword;

a color generator configured to generate a color representation for at least one image element in said image block based on said color codeword;

a selector configured to select, for said at least one image element, an intensity modifier value from said identified intensity modifier set based on said intensity representation sequence; and a modifier configured to modify the intensity of said at least one image element based on said selected intensity modifier value.

41. The mobile user terminal according to claim 40, further comprising an intensity table comprising multiple intensity modifier sets, and said block decoder configured to select said intensity modifier set from said intensity table based on said intensity codeword.

42. The mobile user terminal according to claim 40, wherein said intensity modifier set comprises mathematically complementary intensity modifier values.

43. The mobile user terminal according to claim 40, wherein said intensity representation sequence is a sequence comprising, for each image element in said representation of said image block, an intensity index enabling identification of which of said multiple intensity modifiers of said intensity modifier set to use for said image element).

44. The mobile user terminal according to claim 40, wherein said intensity modifier is configured for adding a selected intensity modifier value to all color component values of said color representation.

45. The mobile user terminal according to claim 40, wherein said intensity modifier is configured for adding a selected intensity modifier value multiplied by component-specific weights to all color component values of said color representation.

46. The mobile user terminal according to claim 45, wherein said intensity modifier is configured for clamping the sums of said intensity modifier value and said color representation values between a minimum threshold value and a maximum threshold value.

47. The mobile user terminal according to claim 40, wherein said image block comprises $2^m \times 2^n$ image elements, where m=3−n and n=0, 1, 2, 3.

48. The mobile user terminal according to claim 40, wherein said compressed representation of said image block is a 32-bit sequence, where said color codeword comprises 12 bits, said intensity codeword comprises 4 bits and said intensity representation sequence comprises 16 bits.

* * * * *